(12) United States Patent
Tanaka et al.

(10) Patent No.: US 11,294,480 B2
(45) Date of Patent: Apr. 5, 2022

(54) ELECTRONIC PEN OF ELECTROMAGNETIC COUPLING TYPE

(71) Applicant: Wacom Co., Ltd., Saitama (JP)

(72) Inventors: Kohei Tanaka, Saitama (JP); Kenichi Ninomiya, Saitama (JP); Takenori Kaneda, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 17/356,027

(22) Filed: Jun. 23, 2021

(65) Prior Publication Data

US 2021/0318767 A1    Oct. 14, 2021

Related U.S. Application Data

(63) Continuation of application No. PCT/JP2019/044208, filed on Nov. 12, 2019.

(30) Foreign Application Priority Data

Feb. 8, 2019 (JP) .............................. JP2019-021504

(51) Int. Cl.
*G06F 3/03* (2006.01)
*G06F 3/0354* (2013.01)
*G06F 3/044* (2006.01)
*G06F 3/038* (2013.01)
*G06F 3/046* (2006.01)

(52) U.S. Cl.
CPC ........ *G06F 3/03545* (2013.01); *G06F 3/0383* (2013.01); *G06F 3/046* (2013.01); *G06F 3/0441* (2019.05)

(58) Field of Classification Search
CPC .. G06F 3/03545; G06F 3/0441; G06F 3/0383; G06F 3/046
See application file for complete search history.

(56) References Cited

U.S. PATENT DOCUMENTS

2013/0199311 A1* 8/2013 Horie ...................... G01L 1/142
73/862.626
2018/0101251 A1* 4/2018 Fujitsuka ................ G01L 1/148

FOREIGN PATENT DOCUMENTS

JP    2013-161307 A    8/2013
WO    2017/010336 A1   1/2017

OTHER PUBLICATIONS

International Search Report, dated Jan. 7, 2020, for International Application No. PCT/JP2019/044208, 3 pages, (with English Translation).

* cited by examiner

*Primary Examiner* — Lisa S Landis
(74) *Attorney, Agent, or Firm* — Seed IP Law Group LLP

(57) ABSTRACT

An electronic pen of an electromagnetic coupling type has a resonant circuit that includes a coil and that is configured to indicate a position to a position detection sensor through electromagnetic coupling between the resonant circuit and the position detection sensor. The electronic pen includes an electronic pen main body and a pen tip unit configured to be detachable from the electronic pen main body. The pen tip unit includes a pen tip casing in which at least the coil is housed. The electronic pen main body includes a circuit portion of the resonant circuit that is electrically coupled to the coil housed in the pen tip unit when the pen tip unit is attached to the electronic pen main body.

17 Claims, 9 Drawing Sheets

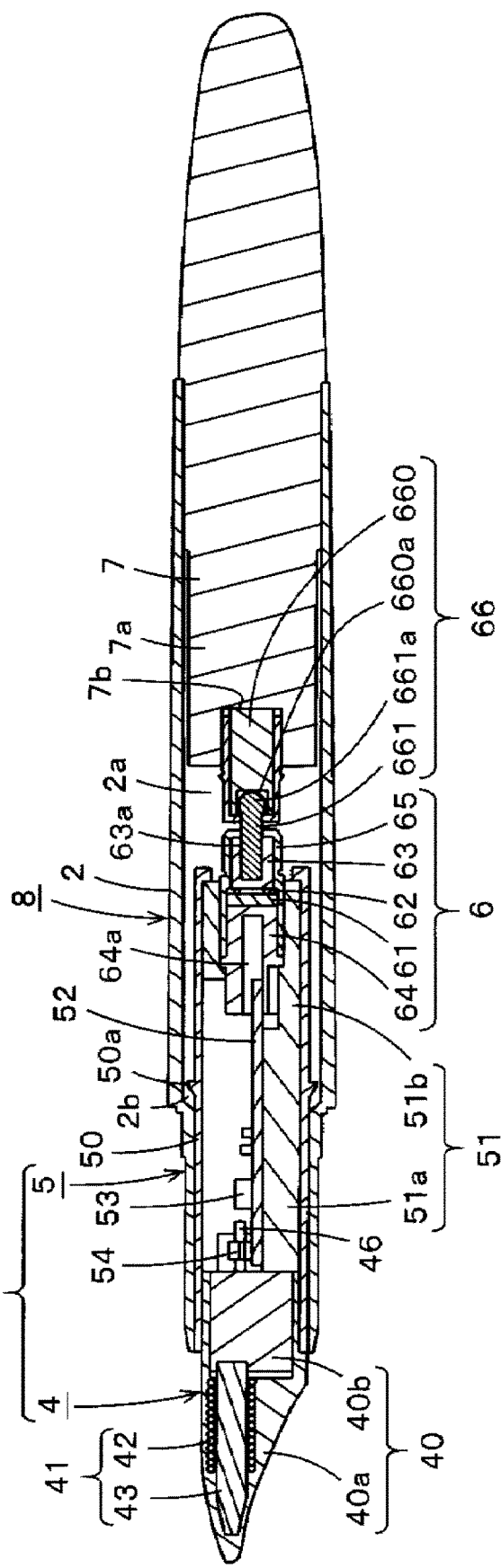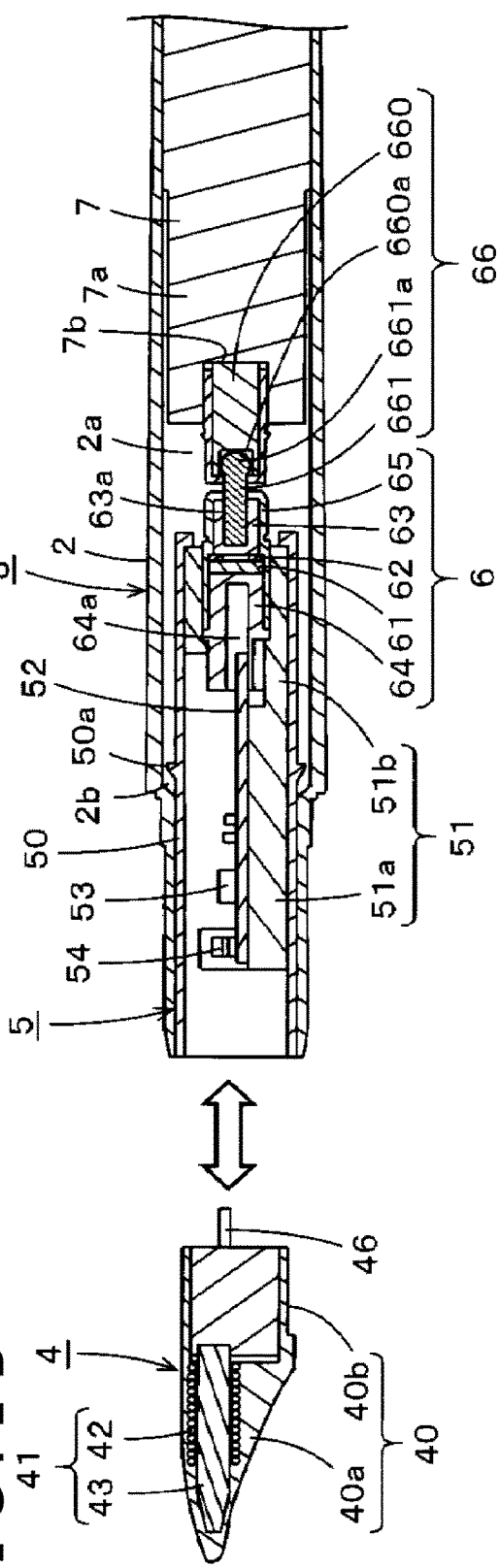

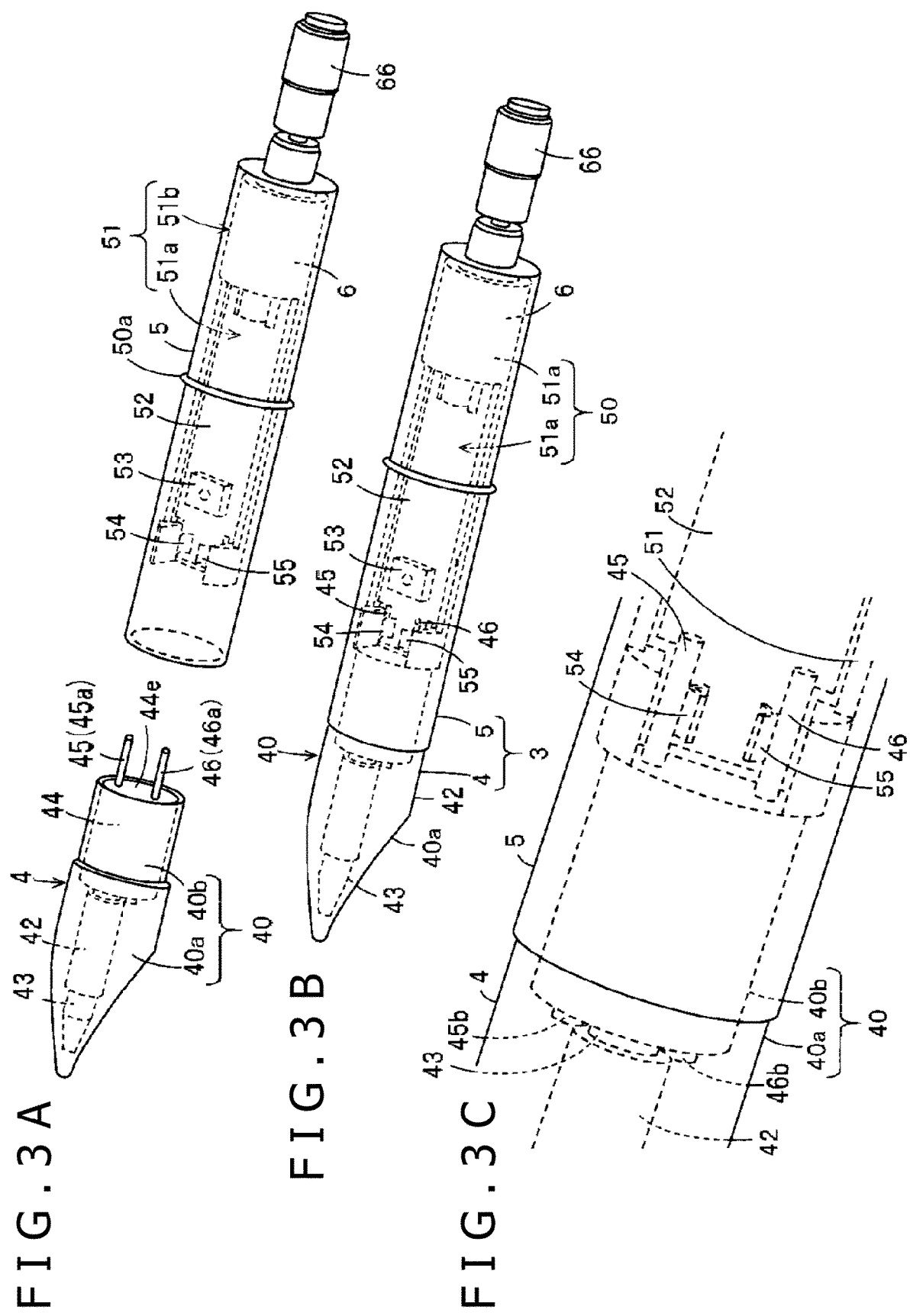

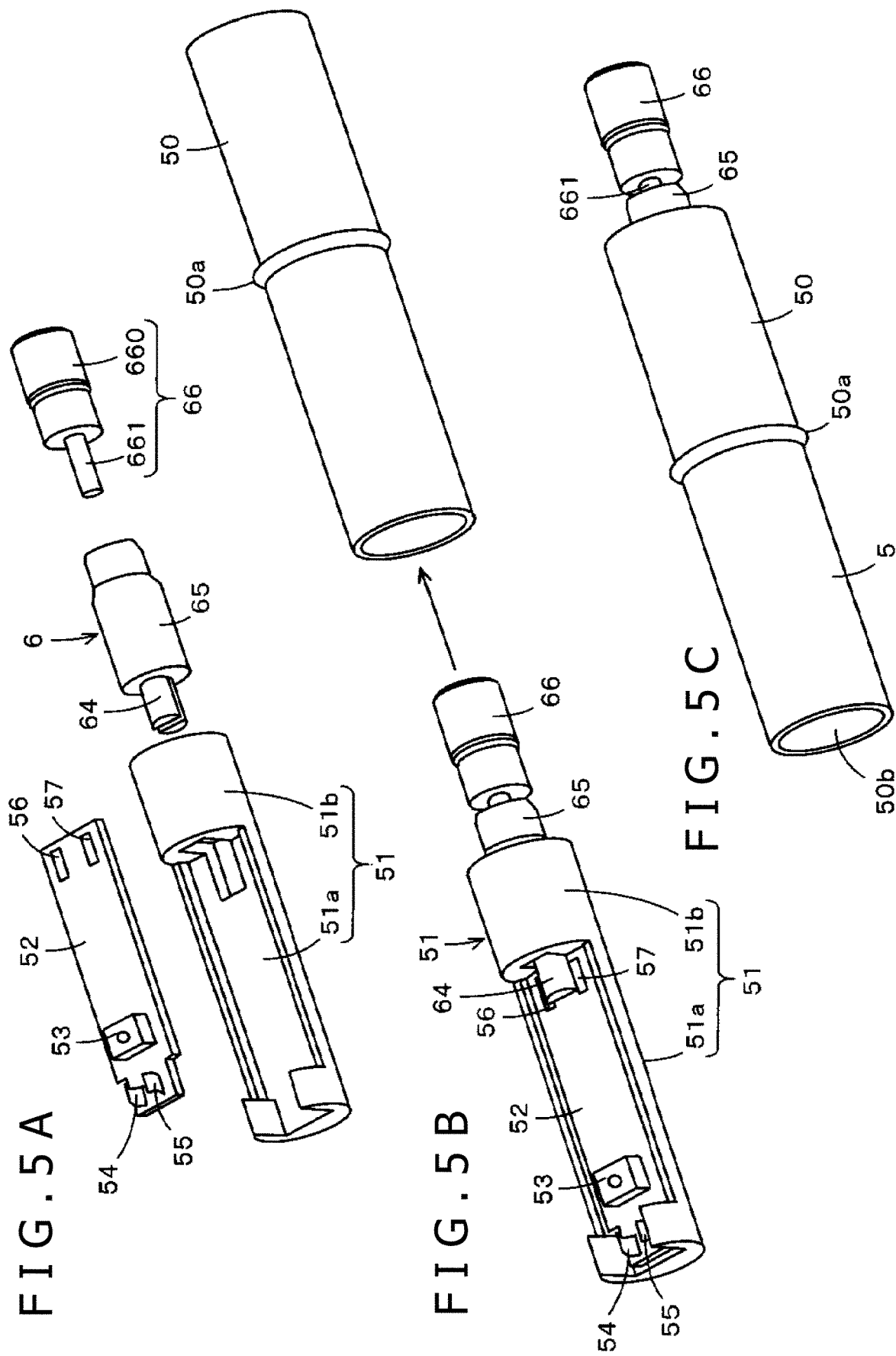

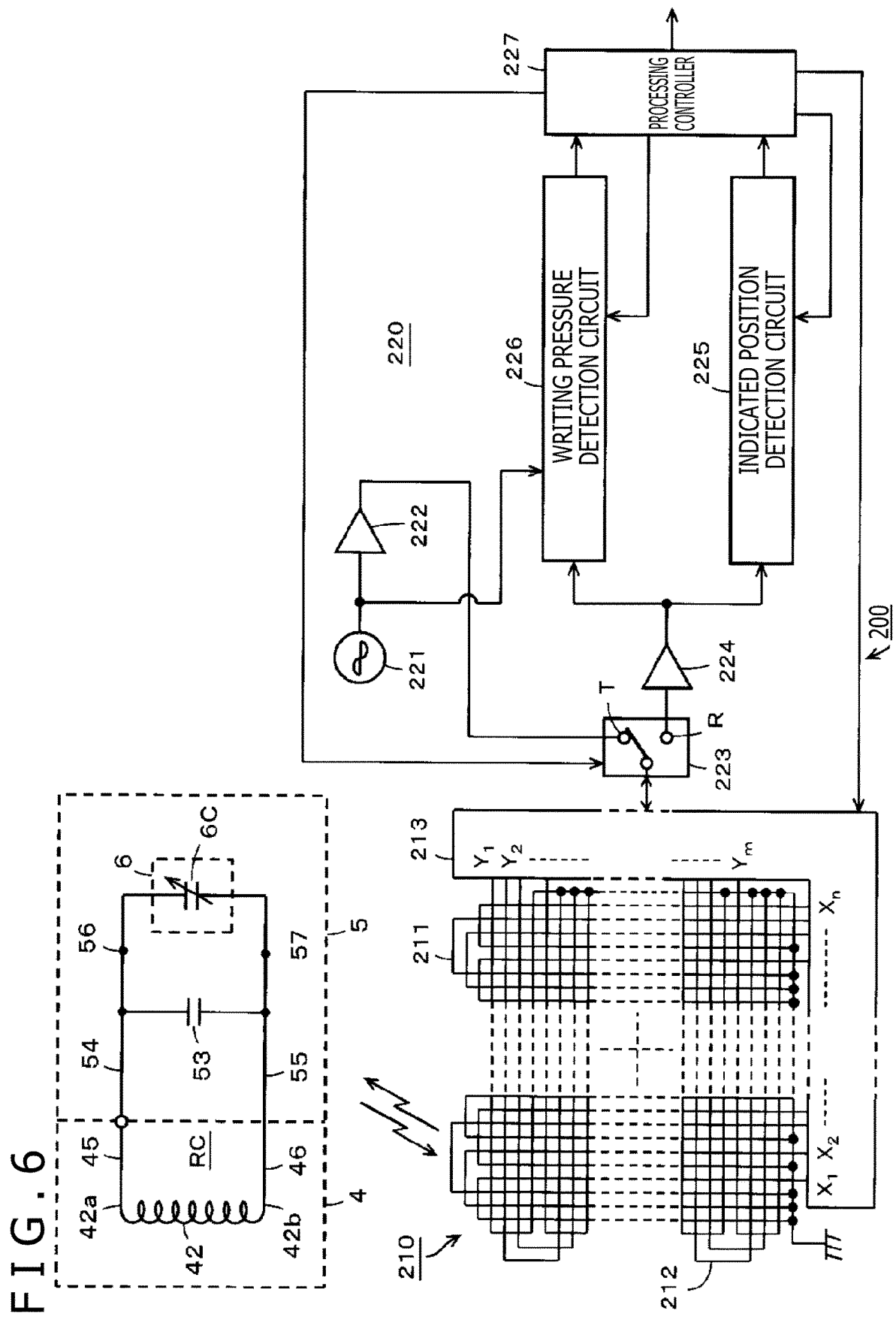

ELECTRONIC PEN OF ELECTROMAGNETIC COUPLING TYPE

BACKGROUND

Technical Field

The present disclosure relates to an electronic pen of an electromagnetic coupling type used together with a position detection device.

Background Art

An electronic pen of an electromagnetic coupling type includes a resonant circuit including a coil and a capacitor. The electronic pen of the electromagnetic coupling type indicates the position to a position detection sensor by performing signal interaction between the resonant circuit and the position detection sensor through electromagnetic coupling. The position detection sensor includes a plurality of electrodes (antenna electrodes) including loop coils. The resonant frequency of the resonant circuit of the electronic pen is adjusted so as to correspond to the frequency of the signal exchanged between the electronic pen and the position detection sensor.

In the electronic pen of the electromagnetic coupling type, the coil is disposed as close as possible to a pen tip of the electronic pen to ensure the strength of the electromagnetic coupling between the electronic pen and the position detection sensor (see WO 2017/010336 (hereinafter, referred to as Patent Document 1)).

Conventionally, the coil is wound around a columnar-shaped magnetic core, and a through hole is formed at the centerline position of the columnar-shaped magnetic core. A writing pressure detector is positioned on the side opposite to the pen tip in the centerline direction of the magnetic core. A core body made of a resin or the like is inserted through the through hole of the magnetic core and fitted into the writing pressure detector, so that a writing pressure applied to a tip portion of the core body can be detected by the writing pressure detector. The core body can be inserted into and detached from the writing pressure detector. In other words, the core body is replaceable.

In recent years, more mobile devices include position detection devices as input devices. Such a mobile device is accompanied by an electronic pen. For this reason, there is a growing demand for miniaturization of the electronic pen to make it easier to accompany the mobile device. The miniaturization of the electronic pen makes a magnetic core thinner. Accordingly, the coil disposed in the electronic pen of the electromagnetic coupling type is wound around such a thinner magnetic core.

In order to improve visibility at a pen tip portion of the electronic pen on the position detection sensor, there is also a demand to reduce the thickness of the casing of the electronic pen on the pen tip side or make the shape of the pen tip portion thinner.

However, if the thickness of the casing on the pen tip side is reduced, the magnetic core may also be made thinner. If such an electronic pen is accidentally dropped from the pen tip, the resin casing on the pen tip side may be damaged. In this case, there is a possibility that the thin magnetic core around which the coil is wound may be damaged, making the coil constituting the resonant circuit defective.

Since the core body attached through the through hole formed in the magnetic core is replaceable, if the electronic pen is dropped and the core body is damaged, only the core body needs to be replaced.

However, in the existing electronic pen of the electromagnetic coupling type, as described in Patent Document 1, the coil is configured as a module that is unitized with a writing pressure detector and the like in a holder holding a printed circuit board for a circuit portion in which components constituting the resonant circuit together with the coil are disposed.

When the coil becomes defective, the user needs to replace the entire module inside the casing of the electronic pen. In some cases, the user even needs to purchase a new electronic pen. This has placed an economic burden on the user.

BRIEF SUMMARY

Therefore, it is desirable to provide an electronic pen of an electromagnetic coupling type that can solve the above-described problems.

In order to solve the above-described problems, there is provided an electronic pen of an electromagnetic coupling type including a resonant circuit that includes a coil and that is configured to indicate a position to a position detection sensor through electromagnetic coupling between the resonant circuit and the position detection sensor. The electronic pen includes an electronic pen main body and a pen tip unit configured to be detachable from the electronic pen main body. The pen tip unit includes a pen tip casing in which at least the coil is housed. The electronic pen main body includes a circuit portion of the resonant circuit that is electrically coupled to the coil housed in the pen tip unit when the pen tip unit is attached to the electronic pen main body.

In the electronic pen configured as above, the coil constituting the resonant circuit is housed in the pen tip casing of the pen tip unit which is a separate body from the electronic pen main body. The pen tip unit is detachable from the electronic pen main body, and when the pen tip unit is attached to the electronic pen main body, the circuit portion of the electronic pen main body becomes part of the resonant circuit. With this configuration, the electronic pen performs signal interaction with the position detection sensor through electromagnetic coupling between the electronic pen and the position detection sensor.

According to the electronic pen configured in this manner, the coil is disposed in the pen tip unit which is detachable from the electronic pen main body. Therefore, even when the coil becomes defective, only the pen tip unit needs to be replaced. This reduces an economic burden on the user. In addition, the pen tip unit is detachable from the electronic pen main body and is easily replaceable. Accordingly, it is possible to provide various types of pen tip units such as a pen tip unit with a thinner pen tip casing or a thinner pen tip portion that improves visibility, or a stronger and more durable pen tip unit at the expense of visibility.

BRIEF DESCRIPTION OF THE DRAWINGS

FIGS. 1A and 1B are views for describing an example of a configuration of an electronic pen of an electromagnetic coupling type according to a first embodiment of the present disclosure;

FIGS. 3A to 3C are views illustrating an example of a configuration of a pen module constituting a main portion of the electronic pen of the electromagnetic coupling type according to the first embodiment;

FIGS. 5A to 5C are views illustrating an example of a configuration of a circuit unit of the pen module illustrated in FIGS. 3A to 3C;

FIG. 6 is a diagram illustrating an example of circuit configurations of a resonant circuit of the electronic pen of the electromagnetic coupling type and a position detection device according to the first embodiment;

DETAILED DESCRIPTION

Several embodiments of an electronic pen of an electromagnetic coupling type according to the present disclosure will be described below with reference to the drawings.

First Embodiment

Conventionally, position indication input using an electronic pen has been performed on an input surface of a dedicated tablet. Therefore, as long as the position indication input can be performed, there has been no need to take into account the feel of writing of the electronic pen on the input surface.

Recently, however, a position detection device is used as an input device of a mobile terminal including a display, and a hard protective glass of the display is used as an input surface on which the user can perform indication input by using the electronic pen. In this case, if a pen tip of the electronic pen is made of a resin of a hard material or the like, the pen tip slips on the protective glass. This results in giving the user the feel of writing significantly different from the feel of writing that the user has when the user writes with a pencil on paper, which the user is used to using. In light of these circumstances, in recent years, there has been a demand for an electronic pen with a better feel of writing.

One of the easiest ways to change the feel of writing is to change the material of the replaceable core body described in "Description of the Related Art." For example, if the core body is made of polyoxymethylene (POM), the pen tip becomes slippery since POM is a hard material. If the core body is made of elastomer, the material is soft, and thus, the feel of writing becomes tenacious.

However, giving elasticity to the pen tip of an electronic pen, like a pen tip of a fountain pen, is not possible just by simply changing the material of the tip of the core body having a specific shape such as an existing rod shape.

A first embodiment described below provides an electronic pen whose pen tip can easily be changed to the one with a desired pen tip structure and shape without using the core body described above and whose pen tip can have elasticity in addition to hardness or softness. The electronic pen according to the first embodiment can, therefore, provide a variety of feels of writing.

Figure 2:
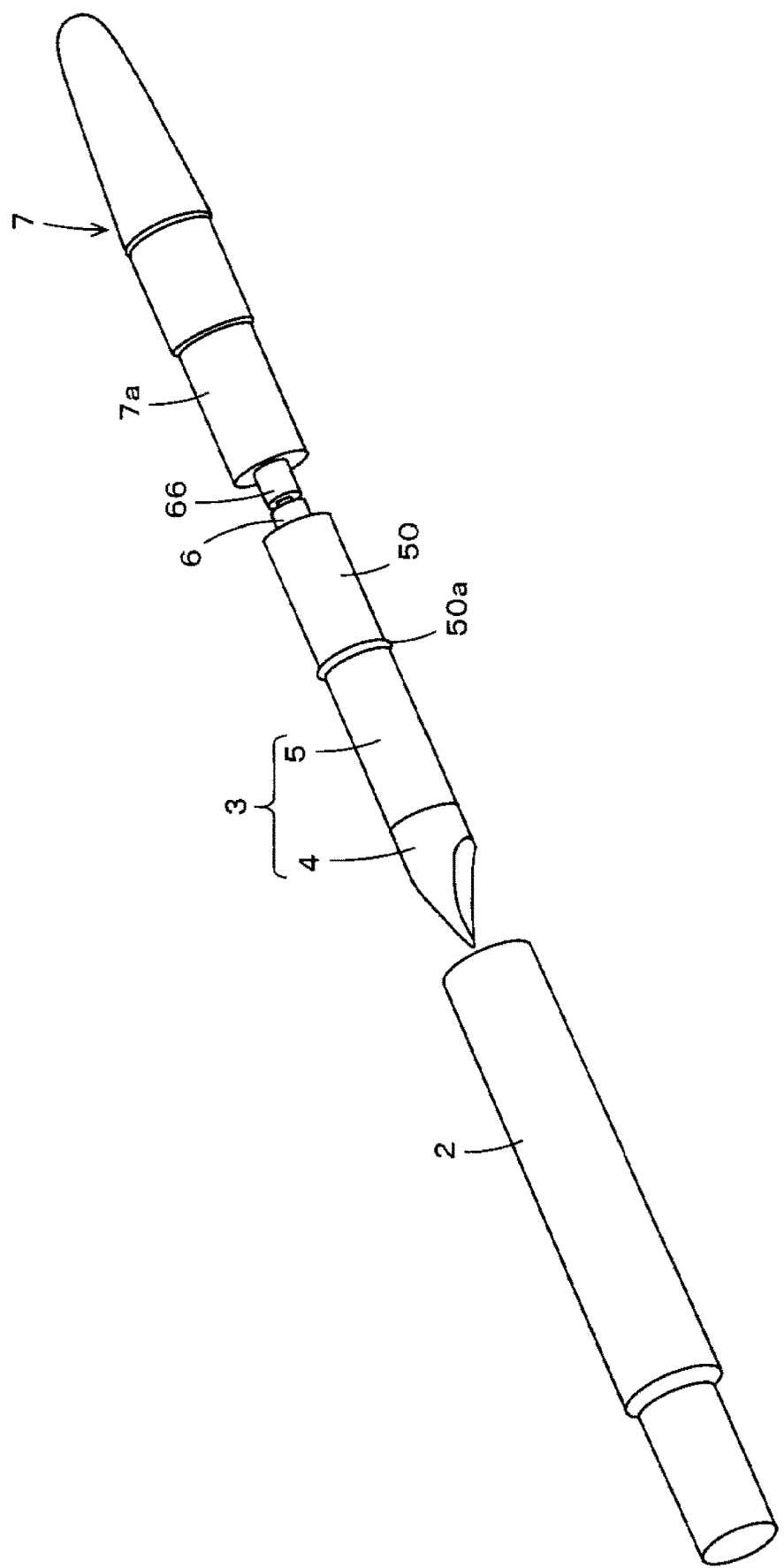
FIG. 2 is an exploded perspective view illustrating an assembly configuration of the electronic pen of the electromagnetic coupling type according to the first embodiment.

FIG. 1A is a cross-sectional view for describing an example of an overall configuration of an electronic pen 1 according to the first embodiment. FIG. 2 is an exploded perspective view illustrating an assembly configuration of the electronic pen 1 according to the first embodiment.

As illustrated in FIG. 1A, in the electronic pen 1 according to the first embodiment, a pen module 3 is housed in a hollow portion 2a of a cylindrical electronic pen outer casing 2. In this example, as illustrated in FIG. 2, the electronic pen outer casing 2 has a cylindrical shape in which the hollow portion 2a has a columnar shape.

In this example, as illustrated in FIGS. 1A, 1B, and 2, the pen module 3 includes a pen tip unit 4 and a circuit unit 5. As illustrated in FIG. 1B, the pen tip unit 4 is detachable from the circuit unit 5.

As illustrated in FIG. 1A, the pen module 3 is housed in the hollow portion 2a of the cylindrical electronic pen outer casing 2, with a pen tip portion of the pen tip unit 4 protruding outward from one opening of the electronic pen outer casing 2. In this case, the pen module 3 is housed in the hollow portion 2a of the electronic pen outer casing 2 such that the pen module 3 is movable in an axial direction of the electronic pen 1. In the electronic pen 1 according to the first embodiment, the circuit unit 5 of the pen module 3 includes a writing pressure detector 6 at an end portion opposite to an end portion where the circuit unit 5 is coupled to the pen tip unit 4.

The writing pressure detector 6 according to this example includes a variable-capacitance capacitor whose capacitance changes according to a writing pressure applied to the pen tip. As illustrated in FIGS. 1A and 1B, the writing pressure detector 6 according to this example includes, as pressure-sensitive components, a plurality of components including a dielectric 61, a spacer member 62 made of an insulating material, a conductive elastic member 63, and a locking member 64. These components are housed in a casing 65 of the writing pressure detector 6. In this example, as illustrated in FIGS. 1A and 1B, the pressure-sensitive components are disposed in the order of the locking member 64, the dielectric 61, the spacer member 62, and the conductive elastic member 63 in the axial direction from the pen tip side to the rear end side (opposite to the pen tip side in the axial direction).

The dielectric 61 has a disc shape. Although not illustrated, an electrode constituting a first electrode of the variable-capacitance capacitor is formed on one end surface of the disc shape on the locking member 64 side in the axial direction.

The spacer member 62 is a ring-shaped member that has both insulation and elasticity. The conductive elastic member 63 is made of, for example, a conductive rubber and is disposed such that an end surface of a tip portion thereof faces another end surface of the dielectric 61, constituting a second electrode of the variable-capacitance capacitor.

The locking member 64 is disposed on one side of the dielectric 61 where the electrode is formed. The locking member 64 regulates the dielectric 61 such that the dielectric 61 does not move toward the pen tip in the axial direction. In this example, the locking member 64 protrudes from the casing 65 toward the pen tip. In this example, although not illustrated, terminal conductors respectively connected to the first and second electrodes of the variable-capacitance capacitor constituted by the writing pressure detector 6 are formed on an outer periphery of the locking member 64 by printing, for example.

As described later, the writing pressure detector 6 is housed and held in a cylindrical portion 51b of a holder 51 of the circuit unit 5. As illustrated in FIGS. 1A and 1B, the locking member 64 includes a slit 64a. When the writing pressure detector 6 is housed in the cylindrical portion 51b, the slit 64a pinches a printed circuit board 52 mounted on a printed circuit board mounting portion 51a of the circuit unit 5 and abuts against the printed circuit board 52. With the locking member 64 pinching the printed circuit board 52, the terminal conductors formed on the locking member 64 are connected to a conductor pattern of the printed circuit board 52, so that a variable-capacitance capacitor 6C constituted by the writing pressure detector 6 constitutes part of a resonant circuit RC (see FIG. 6), as described later.

In this example, the conductive elastic member 63 of the writing pressure detector 6 includes a fitting recess 63a into which a pusher 661 of a pusher member 66 is fitted from the rear end side. The pusher member 66 is configured such that the pusher 661 is held in a pusher holder 660. In this example, a spherical portion 661a is located on one side (rear end side) of the pusher 661 opposite to the other side of the pusher 661 where the pusher 661 is fitted into the conductive elastic member 63. The spherical portion 661a is rotatably housed in a fitting portion 660a of the pusher holder 660. In other words, the pusher 661 is coupled to and held in the pusher holder 660 in a state of what is called a universal joint.

As illustrated in FIGS. 1A and 1B, an opening of the electronic pen outer casing 2 on the side opposite to the pen tip of the electronic pen 1, that is, an opening on the rear end side, is closed by a rear end member 7. The rear end member 7 includes a locking insertion portion 7a. The locking insertion portion 7a is inserted into the hollow portion 2a of the electronic pen outer casing 2 to lock the rear end member 7 to the electronic pen outer casing 2. In the electronic pen 1 according to the first embodiment, a fitting portion 7b into which part of the pusher member 66 of the writing pressure detector 6 is fitted is disposed at an end portion of the locking insertion portion 7a of the rear end member 7 on the pen tip side.

In assembling the electronic pen 1, as illustrated in FIG. 2, the pusher member 66 of the writing pressure detector 6 disposed in the circuit unit 5 of the pen module 3 is fitted into the fitting portion 7b disposed at the end portion of the locking insertion portion 7a of the rear end member 7, so that the rear end member 7 and the pen module 3 are coupled to each other. Then, as illustrated in FIG. 2, the pen module 3 and the rear end member 7 coupled to each other are inserted from the opening on the rear end side of the electronic pen outer casing 2, so that the rear end member 7 is locked to the electronic pen outer casing 2. At this time, as described above, the pen tip portion of the pen tip unit 4 protrudes from the electronic pen outer casing 2, as illustrated in FIG. 1A.

In this case, as illustrated in FIGS. 1A and 2, a ring-shaped protrusion 50a is formed on an outer peripheral side surface of a circuit casing 50 of the circuit unit 5 of the pen module 3, while a stepped portion 2b is formed on the hollow portion 2a of the electronic pen outer casing 2. With the ring-shaped protrusion 50a of the circuit casing 50 of the circuit unit 5 of the pen module 3 engaging with the stepped portion 2b, even if the coupling between the pen module 3 and the rear end member 7 is detached, the pen module 3 does not fall out of the opening on the pen tip side of the electronic pen outer casing 2.

In the electronic pen 1 assembled in this manner, when the writing pressure is applied to the pen tip of the pen tip unit 4 of the pen module 3, the entire pen module 3 is displaced in the hollow portion 2a of the electronic pen outer casing 2 toward the rear end member 7 in the axial direction according to the applied writing pressure. Since the rear end member 7 is press-fitted into the electronic pen outer casing 2, even though the writing pressure is applied, the rear end member 7 does not move. Therefore, in the writing pressure detector 6, the dielectric 61 is pressed toward the conductive elastic member 63 in response to the displacement of the pen module 3 in the axial direction according to the writing pressure. Accordingly, the contact area between the conductive elastic member 63 and the dielectric 61 facing each other via the spacer member 62 changes according to the writing pressure, making the capacitance of the variable-capacitance capacitor change according to the writing pressure. In this manner, the writing pressure detector 6 receives the pressure generated by the movement of the pen module 3 in the axial direction according to the applied writing pressure, thereby detecting the writing pressure applied to the pen tip.

In FIG. 2, with the pen tip unit 4 attached to the circuit unit 5 of the pen module 3, the rear end member 7 and the pen module 3 are coupled to each other and inserted into the hollow portion 2a of the electronic pen outer casing 2. Alternatively, the pen tip unit 4 can be attached to the circuit casing 50 of the circuit unit 5 of the pen module 3 later, as illustrated in FIG. 1B.

In the electronic pen 1 according to the first embodiment, the circuit unit 5 of the pen module 3 and the rear end member 7 which are housed in the electronic pen outer casing 2 can serve as an electronic pen main body 8. Since the pen tip unit 4 of the pen module 3 is detachable from the casing of the circuit unit 5 of the pen module 3, the pen tip unit 4 is detachable from the electronic pen main body 8 in the electronic pen 1 according to the first embodiment, as illustrated in FIG. 1B.

The overview of the electronic pen 1 according to the first embodiment has been described above. Next, a detailed configuration of the pen module 3, which is a main portion of the electronic pen 1 according to the first embodiment, will be described.

[Example of Configuration of Pen Module 3]

FIGS. 3A to 3C are views illustrating an example of the configuration of the pen module 3 of the electronic pen 1 according to the first embodiment. Specifically, FIG. 3A is a perspective view of the pen tip unit 4 and the circuit unit 5 separated from each other. FIG. 3B is a perspective view of the pen tip unit 4 and the circuit unit 5 coupled to each other. FIG. 3C is an enlarged view for describing an electrical connection at a portion in which the pen tip unit 4 and the circuit unit 5 are coupled to each other.

<Example of Configuration of Pen Tip Unit 4>

Figure 4A:
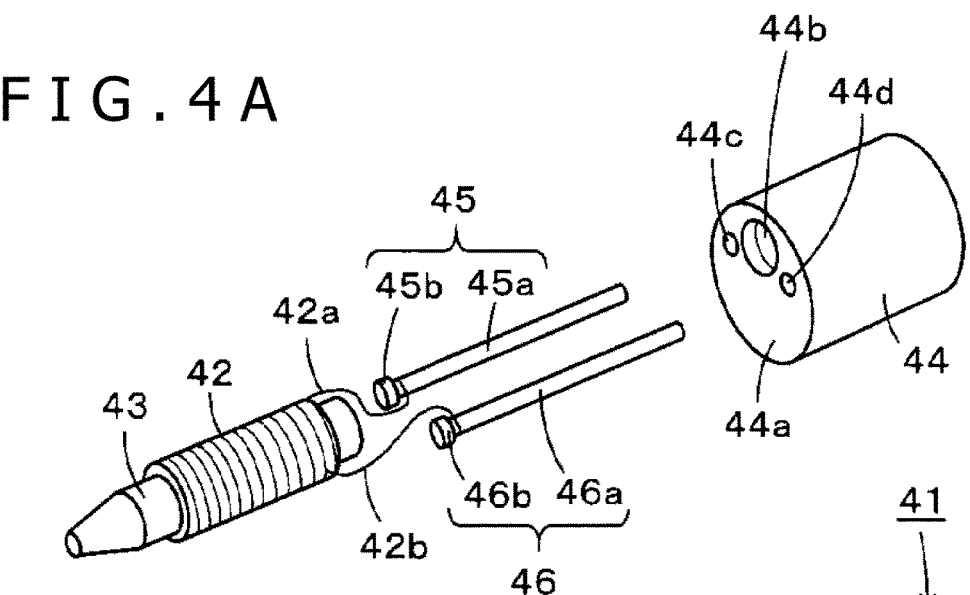
FIGS. 4A to 4C are views illustrating an example of a configuration of a pen tip unit of the pen module illustrated in FIGS. 3A to 3C.
Figure 4B:
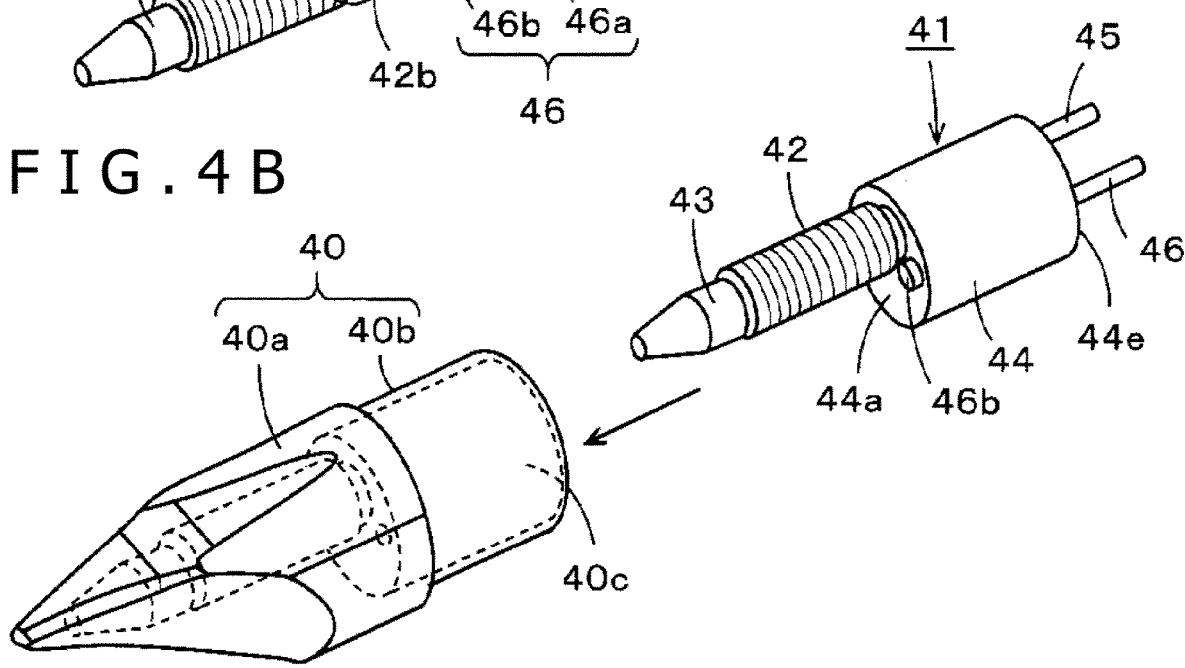
Figure 4C:
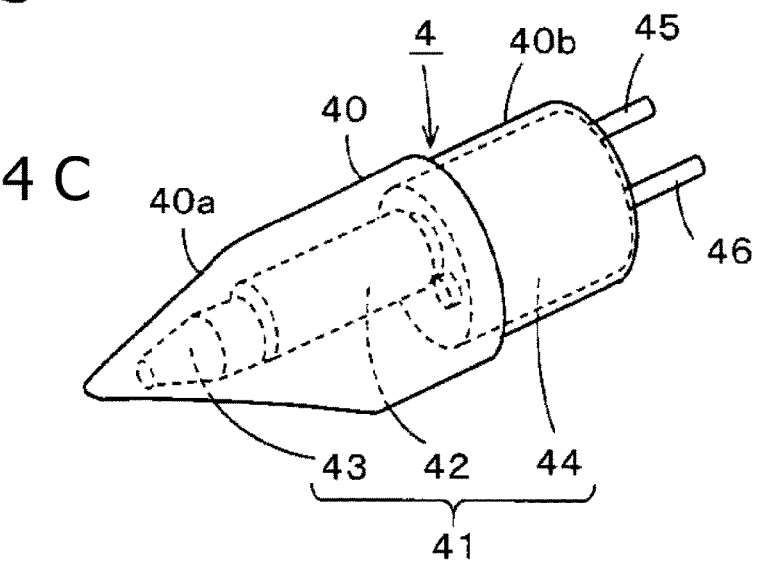

FIGS. 4A to 4C are exploded perspective views for describing an example of a configuration of the pen tip unit 4. As illustrated in FIG. 4B, in this example, the pen tip unit 4 includes a pen tip casing 40 in which a coil member 41 is housed.

In this example, the pen tip casing 40 includes a pen tip portion 40a and a fitting portion 40b. The pen tip portion 40a is made of an elastic resin and has a shape of a pen tip of a fountain pen. The fitting portion 40b is inserted and fitted into the circuit casing 50, which is to be described later, of the circuit unit 5 and coupled to the circuit unit 5. As illustrated in FIGS. 1A, 1B, 2, 3A, 3B, 4B, and 4C, the pen tip portion 40a of the pen tip casing 40 is shaped such that the position of the pen tip corresponds to an eccentric position where the position of the pen tip is deviated from the line of the extension of the centerline of the electronic pen outer casing 2. Since the pen tip portion 40a of the pen tip casing 40 is shaped in this manner, the pen tip portion 40a of the pen tip unit 4 has a similar elasticity to elasticity provided when the pen tip of the fountain pen is used to write.

As illustrated in FIG. 4B, the pen tip casing 40 includes a recess 40c, which is denoted by a dotted line. The shape of the recess 40c matches the shape of the coil member 41 so as to house the coil member 41 inside the pen tip casing 40.

In the coil member 41, a magnetic core 43 around which a coil 42 is wound is held by a holder 44. The magnetic core 43 is, for example, constituted by a ferrite core. In this example, the holder 44 includes two electrode terminals 45 and 46 electrically connected to a winding start end 42a and a winding finish end 42b of the coil 42, respectively.

Each of the electrode terminals 45 and 46 is, for example, made of a conductive metal and has a rod-shaped body. As illustrated in FIG. 4A, the electrode terminal 45 includes a rod-shaped portion 45a and a head portion 45b, while the electrode terminal 46 includes a rod-shaped portion 46a and a head portion 46b. The diameters of the head portions 45b and 46b are slightly larger than the diameters of the rod-shaped portions 45a and 46a. For example, the winding start end 42a of the coil 42 is wound around the electrode terminal 45 in the vicinity of the head portion 45b of the electrode terminal 45 while the winding finish end 42b of the coil 42 is wound around the electrode terminal 46 in the vicinity of the head portion 46b of the electrode terminal 46. In this manner, the winding start end 42a and the winding finish end 42b are electrically connected to the electrode terminals 45 and 46, respectively.

The holder 44 is made of an insulating material, in this example, a resin. Further, in this example, the holder 44 has a columnar shape. As illustrated in FIG. 4A, a recess 44b is formed on a circular end surface 44a which is one end surface of the holder 44 in the columnar shape. As described above, the coil 42 is wound around the magnetic core 43. An end portion of the magnetic core 43 on the side opposite to the pen tip is fitted into the recess 44b. As illustrated in FIG. 4A, the recess 44b is formed not at a center position of the circular end surface 44a of the holder 44, but at a position eccentric from the center position of the circular end surface 44a, in order to make the pen tip shape match the shape of the pen tip of the fountain pen.

The holder 44 has through holes 44c and 44d in the axial direction into which the rod-shaped portions 45a and 46a of the electrode terminals 45 and 46 are inserted, respectively. The diameters of the head portions 45b and 46b of the electrode terminals 45 and 46 are larger than the diameters of the through holes 44c and 44d. The rod-shaped portions 45a and 46a of the electrode terminals 45 and 46 are inserted through the through holes 44c and 44d of the holder 44, respectively, so that end portions of the rod-shaped portions 45a and 46a protrude from an end surface 44e of the holder 44 on the side opposite to the circular end surface 44a, as illustrated in FIG. 4B. Accordingly, the end portion of the magnetic core 43 opposite to the pen tip side is fitted into the recess 44b of the circular end surface 44a. In this manner, the coil member 41 illustrated on the right side of FIG. 4B is formed.

As illustrated in FIG. 4B, the coil member 41 formed in this manner is inserted and housed in the recess 40c of the pen tip casing 40 and is, for example, glued with an adhesive material so as to be fixed inside the pen tip casing 40. As a result, the pen tip unit 4 is formed as illustrated in FIG. 4C. In this case, as illustrated in FIGS. 1B and 3A, the end surface 44e of the holder 44 of the coil member 41 is exposed on the side opposite to the pen tip of the pen tip casing 40. Accordingly, the two electrode terminals 45 and 46 protruding from the end surface 44e protrude in the axial direction from the end portion of the pen tip unit 4 on the side opposite to the pen tip.

<Example of Configuration of Circuit Unit 5>

FIG. 5A is an exploded perspective view for describing constituent components housed in the circuit casing 50 of the circuit unit 5. FIG. 5B is a view for describing how the constituent components illustrated in FIG. 5A are assembled and housed in the circuit casing 50. FIG. 5C is a view illustrating an external appearance of the circuit unit 5 with the assembled constituent components housed in the circuit casing 50. An internal configuration of the circuit unit 5 of FIG. 5C is identical to that of the circuit unit 5 whose constituent components are denoted by dotted lines on the right side of FIG. 3A.

As illustrated in FIG. 5B, in this example, the circuit unit 5 is configured such that the holder 51 which holds the printed circuit board 52 and the writing pressure detector 6 is housed in the circuit casing 50.

In this example, the circuit casing 50 is a cylindrical body made of an insulating resin and including the above-described ring-shaped protrusion 50a on its outer periphery, as illustrated in FIG. 5B. In this example, the outer diameter of this cylindrical body, that is, the circuit casing 50, is equal to the largest outer diameter of the pen tip portion of the pen tip casing 40 of the pen tip unit 4, while the inner diameter thereof is approximately equal to or slightly smaller than the outer diameter of the fitting portion 40b of the pen tip casing 40 of the pen tip unit 4 (see FIGS. 3A and 3B).

In this example, the holder 51 is made of an insulating resin and includes the printed circuit board mounting portion 51a and the cylindrical portion 51b for housing the writing pressure detector 6 as illustrated in FIGS. 5A and 5B. As illustrated in FIGS. 5A and 5B, substantially half of a portion of a peripheral side surface of a cylindrical body in the axial direction is cut out, shaping the printed circuit board mounting portion 51a. Accordingly, the holder 51 has a boat shape. As illustrated in FIG. 5A, the printed circuit board 52 is mounted on the printed circuit board mounting portion 51a and fixed by, for example, adhesion, so that the printed circuit board 52 is held in the holder 51 as illustrated in FIG. 5B.

As illustrated in FIGS. 5A and 5B, a capacitor 53 for resonance is disposed on the printed circuit board 52. The capacitor 53 and the coil 42 together constitute the resonant circuit. In addition, terminal plates 54 and 55, which are respectively electrically connected to one end and the other end of the capacitor 53, are disposed at an end portion of the printed circuit board 52 where the circuit unit 5 is coupled to the pen tip unit 4. In this example, each of these terminal plates 54 and 55 is made of a conductive metal plate. As illustrated in FIGS. 3A and 3B, the terminal plates 54 and 55 are disposed at positions where the terminal plates 54 and 55 can contact and be electrically connected to the electrode terminals 45 and 46 of the pen tip unit 4 when the pen tip unit 4 is coupled to the circuit unit 5. As illustrated in FIGS. 3A to 3C, the terminal plates 54 and 55 have a curved shape such that the terminal plates 54 and 55 can elastically be deformed in a width direction perpendicular to a longitudinal direction of the printed circuit board 52.

Further, conductive patterns 56 and 57 used for connection with the writing pressure detector 6 are formed on the rear end side of the printed circuit board 52 in the longitudinal direction thereof.

As illustrated in FIG. 5B, the writing pressure detector 6 with the pusher 661 of the pusher member 66 fitted into the writing pressure detector 6 is housed in the cylindrical portion 51b of the holder 51 for housing the writing pressure detector 6. At this time, as illustrated in the cross-sectional views of FIGS. 1A and 1B, the casing 65 and the locking member 64 of the writing pressure detector 6 are housed in the cylindrical portion 51b, with an end portion of the locking member 64 on the pen tip side pinching the printed circuit board 52 by the slit. Then, the terminal conductors (not illustrated) that are formed on the locking member 64 and connected to the first and second electrodes of the variable-capacitance capacitor 6C constituted by the writing pressure detector 6 are electrically connected to the conductive patterns 56 and 57 of the printed circuit board 52, respectively, by, for example, soldering.

Then, as illustrated in FIG. 5B, from the writing pressure detector 6 side, the holder 51 holding the printed circuit board 52 and the writing pressure detector 6 is inserted into an opening 50b of the circuit casing 50 on the pen tip side, forming the circuit unit 5 as illustrated in FIG. 5C. At this time, as illustrated in FIG. 3A, a space into which the fitting portion 40b of the pen tip unit 4 is inserted is formed on the opening 50b side of the circuit casing 50.

Then, as illustrated in FIGS. 3A and 3B, when the fitting portion 40b of the pen tip unit 4 is inserted from the opening 50b of the circuit casing 50 of the circuit unit 5, the electrode terminals 45 and 46 of the pen tip unit 4 elastically contact and are electrically connected to the terminal plates 54 and 55 formed on the printed circuit board 52 of the circuit unit 5, respectively, as illustrated in FIGS. 3B and 3C. Accordingly, the coil 42 of the pen tip unit 4 and the capacitor 53 on the printed circuit board 52 of the circuit unit 5 constitute the parallel resonant circuit. In the present embodiment, the variable-capacitance capacitor 6C (see FIG. 6) constituted by the writing pressure detector 6 is further connected in parallel to the parallel resonant circuit.

The pen module 3 is formed in this manner. Subsequently, as illustrated in FIG. 2, the pusher member 66 of the writing pressure detector 6 is housed in the fitting portion 7b of the locking insertion portion 7a to couple the rear end member 7 to the rear end side of the pen module 3. Then, the pen module 3 and the rear end member 7 coupled to each other are inserted into the electronic pen outer casing 2 such that the pen tip portion 40a of the pen tip unit 4 protrudes from the opening of the electronic pen outer casing 2. In this manner, the electronic pen according to the first embodiment is formed. As described above, the pen tip unit 4 can be detached from the circuit unit 5 of the pen module 3 housed in the electronic pen outer casing 2.

[Example of Circuit Configurations of Resonant Circuit of Electronic Pen 1 and Position Detection Device]

FIG. 6 is a diagram illustrating an example of circuit configurations of the resonant circuit RC and a position detection device 200. The resonant circuit RC is configured in the electronic pen 1 according to the present embodiment when the pen tip unit 4 is coupled to the circuit unit 5 of the pen module 3 housed in the electronic pen main body 8 as described above. The position detection device 200 includes a position detection sensor 210 which is electromagnetically coupled to the resonant circuit RC.

As illustrated in the upper left portion of FIG. 6, in the electronic pen 1, when the pen tip unit 4 is coupled to the circuit unit 5, the electrode terminals 45 and 46 of the pen tip unit 4 contact and are electrically connected to the terminal plates 54 and 55 disposed on the printed circuit board 52 of the circuit unit 5, respectively. This causes the capacitor 53 to be connected in parallel to the coil 42, forming the parallel resonant circuit RC.

In the printed circuit board 52 of the circuit unit 5, since the first and second electrodes of the variable-capacitance capacitor 6C constituting the writing pressure detector 6 are electrically connected to the conductive patterns 56 and 57, the variable-capacitance capacitor 6C is connected in parallel to the capacitor 53. Therefore, the resonant circuit RC of the electronic pen 1 according to the first embodiment has a circuit configuration in which the capacitor 53 and the variable-capacitance capacitor 6C are connected in parallel to the coil 42.

In the electronic pen 1 according to the first embodiment, when the pen tip unit 4 is not attached, the resonant circuit RC is not formed. In this case, the electronic pen 1 is inoperative.

As illustrated in FIG. 6, the resonant circuit RC is electromagnetically coupled to the position detection sensor 210 of the position detection device 200. The resonant circuit RC has a function of a receiver that receives an electromagnetic signal transmitted from the position detection sensor 210 and a function of a transmitter that returns the received electromagnetic signal to the position detection sensor 210.

In the present embodiment, since the variable-capacitance capacitor 6C constituted by the writing pressure detector 6 is connected in parallel to the capacitor 53 constituting the resonant circuit RC, the resonant frequency of the resonant circuit RC changes as the capacitance of the variable-capacitance capacitor 6C constituted by the writing pressure detector 6 changes according to the pressure (writing pressure) applied to the pen tip portion 40a of the pen tip unit 4.

The position detection device 200 of the electromagnetic coupling type according to this example includes the position detection sensor 210 and a transmission/reception processing circuit 220.

The position detection sensor 210 includes position detection coils in which an X-axis direction loop coil group 211 and a Y-axis direction loop coil group 212 are stacked. By using the position detection sensor 210, the position detection device 200 transmits a signal to the resonant circuit RC of the electronic pen 1 through electromagnetic coupling, and the electronic pen 1 returns the signal received from the position detection device 200, to the position detection sensor 210 through the resonant circuit RC.

Then, the position detection device 200 receives the signal returned from the resonant circuit RC of the electronic pen 1 through electromagnetic coupling. The position detection device 200 detects the position on the position detection sensor 210 indicated by the electronic pen 1, from the position on the position detection sensor 210 where the received signal is detected. In addition, the position detection device 200 detects a phase change in the signal received from the resonant circuit RC of the electronic pen 1 through electromagnetic coupling, thereby detecting a change in the resonant frequency. Accordingly, the position detection device 200 detects the writing pressure applied to the pen tip of the electronic pen 1.

The transmission/reception processing circuit 220 includes a selection circuit 213 to which the X-axis direction loop coil group 211 and the Y-axis direction loop coil group 212 of the position detection sensor 210 are connected. The selection circuit 213 sequentially selects one loop coil among the two loop coil groups 211 and 212.

The transmission/reception processing circuit 220 includes an oscillator 221, a current driver 222, a switching connection circuit 223, a reception amplifier 224, an indicated position detection circuit 225, a writing pressure detection circuit 226, and a processing controller 227. The processing controller 227 includes a microcomputer. The processing controller 227 controls the selection of the loop coil in the selection circuit 213, the switching of the switching connection circuit 223, and the processing timing in the indicated position detection circuit 225 and the writing pressure detection circuit 226.

The oscillator 221 generates an alternating current (AC) signal of frequency f0. Then, the oscillator 221 supplies the generated AC signal to the current driver 222 and the writing pressure detection circuit 226. The current driver 222 converts the AC signal supplied from the oscillator 221 into current and transmits the current to the switching connection circuit 223. Under the control of the processing controller 227, the switching connection circuit 223 switches the connection destinations (a transmission-side terminal T and a reception-side terminal R) to which the loop coil selected by the selection circuit 213 is connected. The current driver 222 is connected to the transmission-side terminal T, while the reception amplifier 224 is connected to the reception-side terminal R.

An induced voltage generated in the loop coil selected by the selection circuit 213 is transmitted to the reception amplifier 224 via the selection circuit 213 and the switching connection circuit 223. The reception amplifier 224 amplifies the induced voltage supplied from the loop coil and transmits the amplified induced voltage to the indicated position detection circuit 225 and the writing pressure detection circuit 226.

A radio wave transmitted from the electronic pen 1 generates an induced voltage in each of the loop coils of the X-axis direction loop coil group 211 and the Y-axis direction loop coil group 212. The indicated position detection circuit 225 detects the induced voltage generated in each loop coil, that is, a reception signal, converts the detection output signal into a digital signal, and outputs the digital signal to the processing controller 227. The processing controller 227 calculates the coordinate values of the position indicated by the electronic pen 1 in the X-axis direction and the Y-axis direction, based on each digital signal from the indicated position detection circuit 225, that is, the level of the voltage value of the induced voltage generated in each loop coil.

Meanwhile, the writing pressure detection circuit 226 detects the output signal of the reception amplifier 224 in synchronization with the AC signal from the oscillator 221 to obtain a signal with a level corresponding to the phase difference (frequency shift) between these signals. The writing pressure detection circuit 226 then converts the signal corresponding to the phase difference (frequency shift) into a digital signal and outputs the digital signal to the processing controller 227. The processing controller 227 detects the writing pressure applied to the electronic pen 1, based on the digital signal from the writing pressure detection circuit 226, that is, the level of the signal corresponding to the phase difference (frequency shift) between the transmitted radio wave and the received radio wave.

Effects of Electronic Pen 1 According to First Embodiment

In the electronic pen 1 according to the first embodiment described above, the coil member 41 including the magnetic core 43 around which the coil 42 constituting the resonant circuit is wound is housed in the pen tip unit 4, and the pen tip unit 4 can be detached from the electronic pen main body 8. As an effect of the electronic pen 1 according to the first embodiment, therefore, even if the electronic pen 1 is accidentally dropped and the magnetic core 43 is damaged, causing a defect in the coil member 41, only the pen tip unit 4 needs to be replaced.

Further, the pen tip unit 4, which houses the coil member 41, can be detached from the electronic pen main body 8. Therefore, it is possible to provide pen tip units 4 with various pen tip structures and shapes that the user can replace. In this case, as an effect of the electronic pen 1 according to the first embodiment, the pen tip unit 4 can optimally configure electromagnetic coupling to the position detection sensor according to the pen tip structure and shape.

That is, the position of the coil, which constitutes the resonant circuit of the electronic pen of the electromagnetic coupling type, in the pen tip requires a predetermined positional relation between the resonant circuit and the position detection sensor that is electromagnetically coupled to the resonant circuit. Therefore, if the structure and shape of the pen tip are changed, the coil position optimal thereto changes accordingly.

However, in the electronic pen 1 according to the above-described embodiment, the coil member 41 is housed in the pen tip unit 4, which is detachable from the electronic pen main body 8. Therefore, when the structure and shape of the pen tip are changed, the coil can be disposed at an optimal position in the pen tip unit 4 according to the structure and shape of the pen tip.

In this case, in the electronic pen according to the first embodiment, since the writing pressure detector 6 detects the writing pressure applied to the pen tip as a displacement of the entire pen module 3 corresponding to the writing pressure, a magnetic core having a through hole and a core body inserted through the through hole are unnecessary. Accordingly, the pen tip portion 40a of the pen tip casing 40, which is made of, for example, a resin, of the pen tip unit 4 can have various pen tip shapes and structures. This makes it easier to configure the pen tip with a desired feel of writing.

Therefore, the electronic pen according to the first embodiment can provide various feels of writing by providing pen tip units 4 with various pen tip structures and shapes that the user can replace and use. Examples of the pen tip structures and shapes include a pen tip shape of a ballpoint pen and a pen tip shape of a mechanical pencil, in addition to the shape of the pen tip of the fountain pen described above. In the example described in the first embodiment, since the pen tip unit 4 has the shape of the pen tip of the fountain pen, the pen tip of the pen tip unit 4 may have elasticity.

Second Embodiment

In the first embodiment described above, the pen tip unit 4 houses the magnetic core around which the coil 42 is wound. In another embodiment, a pen tip unit may additionally house a writing pressure detector. An electronic pen according to a second embodiment described below is an example of an electronic pen in which a pen tip unit additionally houses a writing pressure detector.

Figure 7A:
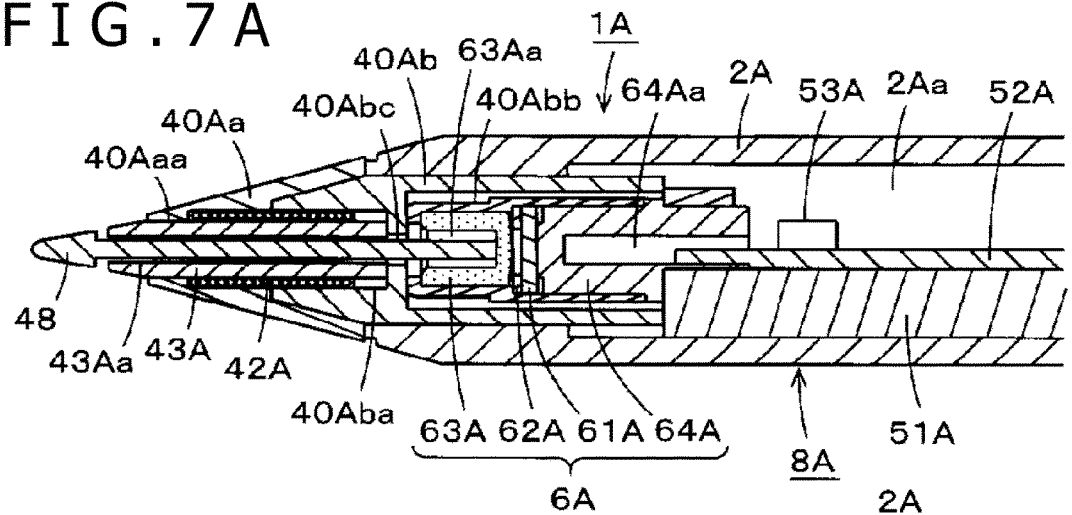
FIGS. 7A to 7D are views for describing an example of a configuration of an electronic pen of the electromagnetic coupling type according to a second embodiment of the present disclosure.
Figure 7B:
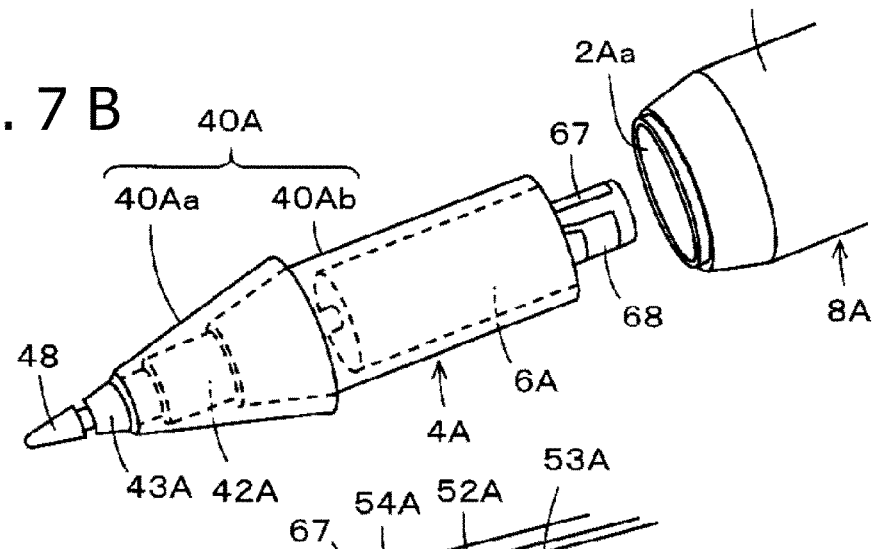
Figure 7C:
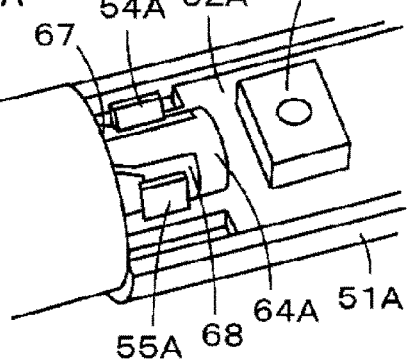
Figure 7D:
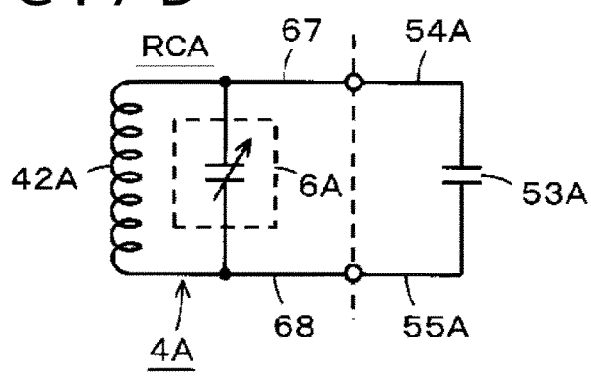

FIGS. 7A to 7D are views for describing an example of a configuration of an electronic pen 1A according to the second embodiment. Specifically, FIG. 7A is a cross-sectional view for describing an example of a configuration of the electronic pen 1A on the pen tip side. FIG. 7B is a view for describing that a pen tip unit 4A of the electronic pen 1A is detachable. FIG. 7C is a view for describing an electrical connection between the pen tip unit 4A and a circuit portion inside the electronic pen 1A. FIG. 7D is a diagram for describing a resonant circuit RCA of the electronic pen 1A. In FIGS. 7A to 7D, parts identical to those of the electronic pen 1 according to the first embodiment are denoted with the same reference signs, and the description thereof is omitted. In addition, parts corresponding to those of the electronic pen 1 according to the first embodiment are denoted with the same reference signs with a suffix "A" added thereto, although there may be a slight difference in configuration.

The electronic pen 1A according to the second embodiment is similar to the electronic pen 1 according to the first embodiment in that the pen tip unit 4A including a coil member 41A is detachable from an electronic pen main body 8A.

However, the electronic pen 1A according to the second embodiment does not include the pen module 3, which includes the circuit unit 5 housed in the electronic pen outer casing 2 in the electronic pen 1 according to the first embodiment, and the circuit portion formed on a printed circuit board 52A is directly housed in an electronic pen outer casing 2A. In other words, in the electronic pen 1A according to the second embodiment, as illustrated in FIG. 7A, the electronic pen main body 8A is configured such that a holder 51A holding the printed circuit board 52A is housed in a hollow portion 2Aa of the electronic pen outer casing 2A. Although not illustrated, the holder 51A includes a printed circuit board mounting portion but does not include a cylindrical portion for housing a writing pressure detector. Since a writing pressure detector 6A is disposed in the pen tip unit 4A, the cylindrical portion for holding the writing pressure detector 6A is not necessary.

As illustrated in FIG. 7C, a capacitor 53A constituting the resonant circuit RCA of the electronic pen 1A is disposed on the printed circuit board 52A, while terminal plates 54A and 55A which are electrically connected to first and second electrodes of the capacitor 53A are disposed at an end portion of the printed circuit board 52A on the side where the pen tip unit 4A is coupled.

Further, although not illustrated in FIG. 7A, a rear end member 7A similar in shape to the rear end member 7 according to the first embodiment is inserted into and closes the rear end side of the hollow portion 2Aa of the electronic pen outer casing 2A of the electronic pen 1A according to the second embodiment so as to positionally regulate the rear end side of the holder 51A. In the second embodiment, the writing pressure detector 6A is not disposed on the rear end side of the printed circuit board 52A and does not include a pusher member. Therefore, the rear end member 7A does not include a recess for housing the pusher member.

As illustrated in FIGS. 7A and 7B, the pen tip unit 4A includes the coil member 41A and the writing pressure detector 6A which are housed in a pen tip casing 40A. As illustrated in FIG. 7A, the pen tip casing 40A according to this example includes a pen tip portion 40Aa and a fitting portion 40Ab which are coupled to each other. The pen tip portion 40Aa has a cone shape in appearance. The fitting portion 40Ab has a columnar shape in appearance. The fitting portion 40Ab is inserted and fitted into the hollow portion 2Aa of the electronic pen outer casing 2A and attached to the electronic pen main body 8A.

The pen tip portion 40Aa has a through hole 40Aaa which is formed in the axial direction in the center of the pen tip portion 40Aa. Further, a recess 40Aba which communicates with the through hole 40Aaa is formed in the fitting portion 40Ab on the side where the fitting portion 40Ab is coupled to the pen tip portion 40Aa. A magnetic core 43A is housed in and firmly attached to the portion in which the through hole 40Aaa of the pen tip portion 40Aa and the recess 40Aba of the fitting portion 40Ab are formed. The magnetic core 43A is constituted by, for example, a ferrite core, and a coil 42A is wound around the magnetic core 43A. A tip portion of the magnetic core 43A on the pen tip side protrudes from the pen tip portion 40Aa. As illustrated in FIG. 7A, the protruding tip portion of the magnetic core 43A is tapered so as to become narrower toward the pen tip.

A recess 40Abb is formed in the fitting portion 40Ab on the side opposite to the side where the fitting portion 40Ab is coupled to the pen tip portion 40Aa. The recess 40Abb houses the writing pressure detector 6A. A core body 48, which is to be described later, can be inserted through a through hole 40Abc which is formed between the recess 40Abb of the fitting portion 40Ab and the recess 40Aba on the pen tip side.

The writing pressure detector 6A according to this example includes a variable-capacitance capacitor 6AC having a similar configuration to that of the writing pressure detector 6 according to the first embodiment described above. In other words, as illustrated in FIG. 7A, the writing pressure detector 6A according to this example includes, as pressure-sensitive components, a plurality of components including a dielectric 61A, a spacer member 62A made of an insulating material, a conductive elastic member 63A, and a locking member 64A. These components are housed in a casing 65A of the writing pressure detector 6A. In this example, as illustrated in FIG. 7A, the pressure-sensitive components are disposed in the order of the conductive elastic member 63A, the spacer member 62A, the dielectric 61A, and the locking member 64A in the axial direction from the pen tip side to the rear end side.

The writing pressure detector 6A is housed and held in the recess 40Abb of the fitting portion 40Ab of the pen tip unit 4A, as illustrated in FIG. 7A. In this case, as illustrated in FIGS. 7A and 7B, part of the locking member 64A protrudes from the fitting portion 40Ab on the side opposite to the pen tip portion 40Aa. As illustrated in FIGS. 7B and 7C, terminal conductors 67 and 68 are formed on the locking member 64A. The terminal conductors 67 and 68 are formed by using, for example, a molded interconnect device (MID) technique and are electrically connected to first and second electrodes of the variable-capacitance capacitor 6AC constituted by the writing pressure detector 6A. Although not illustrated, in the pen tip unit 4A according to the second embodiment, one end and the other end of the coil 42A are also electrically connected to the terminal conductors 67 and 68, respectively.

As with the first embodiment, as illustrated in FIG. 7A, the locking member 64A includes a slit 64Aa. When the pen tip unit 4A is attached to the electronic pen main body 8A, the slit 64Aa pinches the printed circuit board 52A and abuts against the printed circuit board 52A. In this attached state, as illustrated in FIG. 7C, the terminal conductors 67 and 68 formed on the locking member 64A are connected to the terminal plates 54A and 55A of the printed circuit board 52.

In the electronic pen 1A according to the second embodiment, a through hole 43Aa is formed at the centerline position of the magnetic core 43A, and the core body 48 which is made of, for example, a resin is fitted into a fitting recess 63Aa through the through hole 43Aa and the through hole 40Abc of the fitting portion 40Ab. The fitting recess 63Aa is formed in the conductive elastic member 63A of the writing pressure detector 6A.

Therefore, when a pressure (writing pressure) is applied to the tip portion of the core body 48, the core body 48 is displaced in the axial direction according to the applied pressure, and thus, the conductive elastic member 63A of the writing pressure detector 6A is displaced toward the dielectric 61A via the spacer member 62A. Accordingly, the contact area between the conductive elastic member 63A and the dielectric 61A changes according to the writing pressure. This makes the capacitance of the variable-capacitance capacitor 6AC constituted by the writing pressure detector 6A correspond to the writing pressure.

In the electronic pen 1A according to the second embodiment, when the pen tip unit 4A is attached to the electronic pen main body 8A, the resonant circuit RCA is formed as illustrated in FIG. 7D. As illustrated in FIG. 7D, in the pen tip unit 4A, the variable-capacitance capacitor 6AC constituted by the writing pressure detector 6A is connected in parallel to the coil 42A. Moreover, one end and the other end of the parallel circuit constituted by the coil 42A and the variable-capacitance capacitor 6AC are connected to the terminal conductors 67 and 68, respectively.

Therefore, when the pen tip unit 4A is attached to the electronic pen main body 8A, the capacitor 53A on the printed circuit board 52A is connected in parallel to the parallel circuit constituted by the coil 42A and the variable-capacitance capacitor 6AC, forming the parallel resonant circuit RCA. The resonant frequency of the resonant circuit including the parallel circuit constituted by the coil 42A and the variable-capacitance capacitor 6AC does not match the frequency set for the electromagnetic coupling to the position detection sensor. The resonant circuit RCA in which the capacitor 53A is further connected in parallel to the parallel circuit constituted by the coil 42A and the variable-capacitance capacitor 6AC matches the frequency set for the electromagnetic coupling to the position detection sensor. Therefore, the electronic pen 1A can electromagnetically be coupled to the position detection sensor in a preferable state to perform position indication.

As with the electronic pen 1 according to the first embodiment, the electronic pen 1A according to the second embodiment can not only indicate the position on the position detection sensor 210 but also transmit writing pressure information to the position detection device 200 through electromagnetic coupling to the position detection device 200.

The electronic pen 1A according to the second embodiment also produces effects similar to those of the electronic pen 1 according to the first embodiment described above. In addition, the electronic pen 1A according to the second embodiment advantageously makes the core body 48 independently replaceable.

Other Embodiments

As described above, in the electronic pen 1 (1A) according to the first (second) embodiment, the pen tip unit 4 (4A), which houses the coil constituting the resonant circuit, is detachable from the electronic pen main body 8 (8A) and replaceable. The resonant frequency of the resonant circuit of the electronic pen of the electromagnetic coupling type is adjusted to a frequency at which the electromagnetic coupling between the electronic pen and the position detection sensor becomes large.

However, when the pen tip unit 4 (4A) is replaced by the one with a different pen tip structure and shape, there is a possibility that the frequency characteristic changes. Even with the pen tip structure and shape of the same type, if there is a variation in the coil member including the magnetic core around which the coil is wound, there is a possibility that the resonant frequency of the resonant circuit changes due to the replacement of the pen tip unit 4 (4A). For this reason, it would be useful if the resonant frequency of the resonant circuit is adjustable.

In view of the points described above, an electronic pen according to each of other embodiments described below is an example of an electronic pen that enables adjustment of the resonant frequency of the resonant circuit.

First Example

Figure 8:
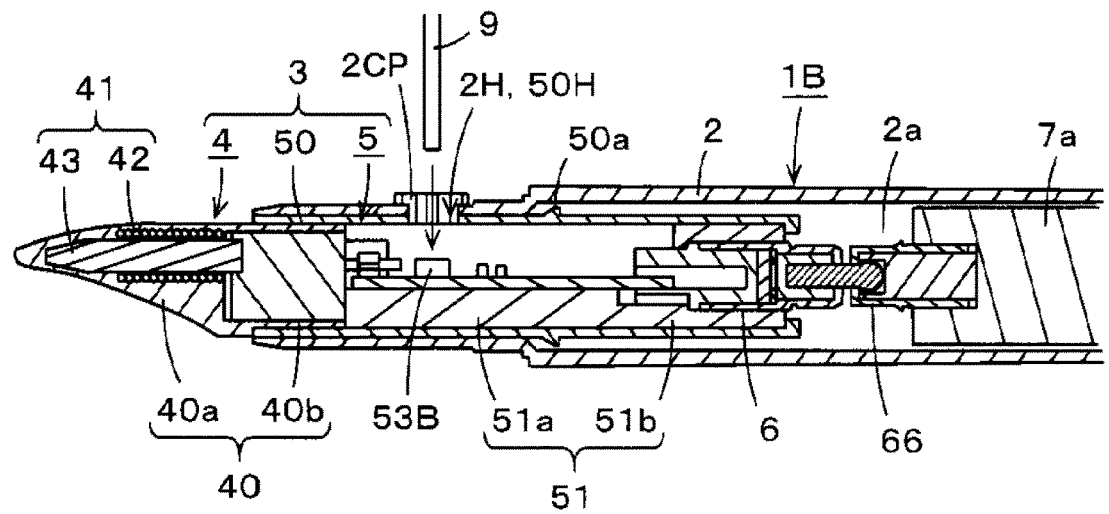
FIG. 8 is a view for describing an example of a configuration of an electronic pen of the electromagnetic coupling type according to a first example of another embodiment of the present disclosure.

FIG. 8 is a view illustrating an example of an electronic pen 1B according to a first example which enables the user to adjust the resonant frequency of the resonant circuit. The electronic pen 1B according to the first example illustrated in FIG. 8 enables the user to adjust the resonant frequency of the resonant circuit while having a configuration similar to that of the electronic pen 1 according to the first embodiment. Parts identical to those of the electronic pen 1 according to the first embodiment are denoted with the same reference signs, and the description thereof is omitted.

In the electronic pen 1B according to the first example illustrated in FIG. 8, a trimmer capacitor 53B whose capacitance is adjustable constitutes a capacitor constituting a resonant circuit RCB disposed on the printed circuit board 52 mounted on the printed circuit board mounting portion 51a of the holder 51 in the circuit unit 5. In addition, openings 50H and 2H are respectively formed in the circuit casing 50 and the side peripheral surface of the electronic pen outer casing 2 which are immediately above the trimmer capacitor 53B. A cap member 2CP is disposed on the side peripheral surface of the electronic pen outer casing 2 so as to openably close the openings 2H and 50H.

In replacing the pen tip unit 4, the user can remove the cap member 2CP such that the openings 2H and 50H are exposed to the outside. Then, in the state in which the electronic pen 1B and a position detection device 200B are electromagnetically coupled to each other through the resonant circuit RCB, a jig 9 that adjusts the capacitance of the trimmer capacitor 53B is inserted through the openings 2H and 50H to adjust the capacitance of the trimmer capacitor 53B.

The position detection device 200B used with the electronic pen 1B according to this example can inform the user during frequency adjustment whether or not the resonant frequency of the resonant circuit RCB of the electronic pen 1B has become appropriate.

Figure 9:
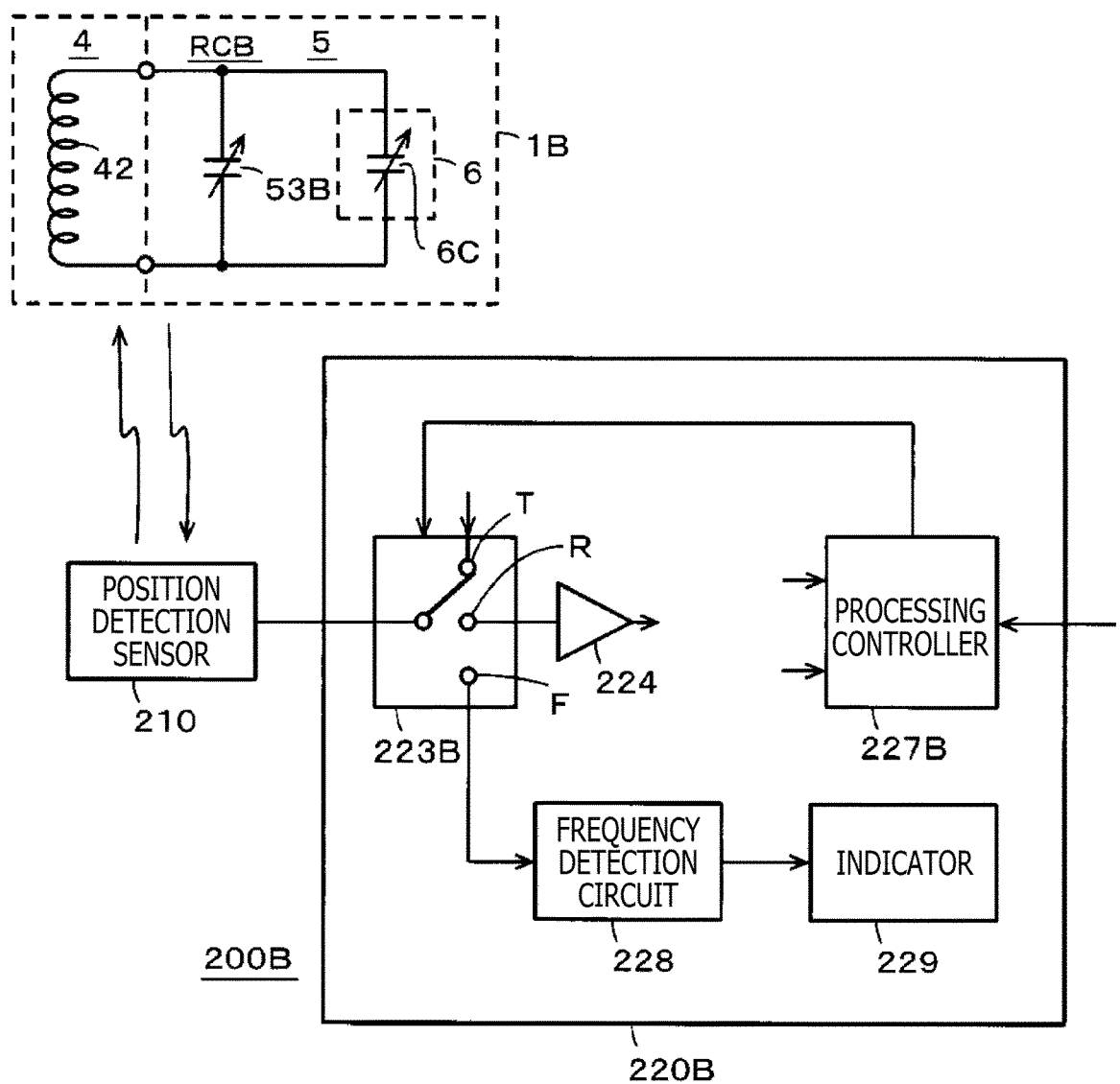
FIG. 9 is a diagram illustrating an example of circuit configurations of a resonant circuit of the electronic pen illustrated in FIG. 8 and a position detection device.

FIG. 9 is a diagram illustrating an example of circuit configurations of the resonant circuit RCB of the electronic pen 1B and a main portion of the position detection device 200B. In FIG. 9, parts identical to those of the position detection device 200 illustrated in FIG. 6 are denoted with the same reference signs, and the description thereof is omitted.

In the position detection device 200B according to this example, a transmission/reception processing circuit 220B, which is connected to the position detection sensor 210, includes a functional portion for detecting whether or not the resonant frequency of the resonant circuit RCB of the electronic pen 1B has become appropriate and a functional portion for informing the user of the electronic pen 1B who is adjusting the frequency that the resonant frequency has become appropriate when it has become so.

That is, as illustrated in FIG. 9, the transmission/reception processing circuit 220B of the position detection device 200B according to this example also includes a switching connection circuit 223B which can not only switch the connection destination to which the loop coil selected by the selection circuit 213 of the position detection sensor 210 is connected, between the transmission-side terminal T and the reception-side terminal R, but also switch between the transmission-side terminal T and a resonant frequency adjustment terminal F. The transmission/reception processing circuit 220B includes a frequency detection circuit 228 and an indicator 229. The frequency detection circuit 228 is connected to the resonant frequency adjustment terminal F of the switching connection circuit 223B. According to the detection output of the frequency detection circuit 228, the indicator 229 informs the user whether or not the resonant frequency is appropriate, by, for example, emitting a beep sound. When a processing controller 227B receives, from the user, an instruction to start a mode of adjusting the resonant frequency of the electronic pen 1B, the processing controller 227B causes the switching connection circuit 223B to switch between the transmission-side terminal T and the resonant frequency adjustment terminal F to be connected. The other configuration of the transmission/reception processing circuit 220B is similar to that of the position detection device 200 illustrated in FIG. 6.

When the processing controller 227B receives, from the user, an instruction to start the mode of adjusting the resonant frequency of the electronic pen 1B, the processing controller 227B causes the switching connection circuit 223B to switch between the transmission-side terminal T and the resonant frequency adjustment terminal F to be connected. At this time, a signal returned from the resonant circuit RCB of the electronic pen 1B is supplied to the frequency detection circuit 228 through the resonant frequency adjustment terminal F of the switching connection circuit 223B. The frequency detection circuit 228 detects the frequency and determines whether or not the received frequency is appropriate. When the frequency detection circuit 228 determines that the received frequency is appropriate, the frequency detection circuit 228 outputs, to the indicator 229, a detection output signal indicating that the received frequency is appropriate. When the indicator 229 receives, from the frequency detection circuit 228, the detection output signal indicating that the received frequency is appropriate, the indicator 229 informs the user thereof by emitting a beep sound.

In this manner, with the help of the beep sound, the user can adjust the capacitance of the trimmer capacitor 53B of the electronic pen 1B by using the jig 9 to adjust the resonant frequency of the resonant circuit RCB to an appropriate frequency.

Although the first example has been applied to the electronic pen 1 according to the first embodiment in the description above, it is needless to say that the first example can also be applied to the electronic pen 1A according to the second embodiment. In the above example, the trimmer capacitor is used as the capacitor for resonance to serve as an element for adjusting the resonant frequency of the resonant circuit of the electronic pen. Alternatively, a variable inductance element whose inductance value can be varied by an operator's adjustment operation may be connected to the resonant circuit and adjusted.

Second Example

According to a second example, an electronic pen and a position detection device can perform wireless communication. Therefore, the resonant frequency of a resonant circuit of the electronic pen can automatically be adjusted by a correction signal transmitted from the position detection device.

Figure 10:
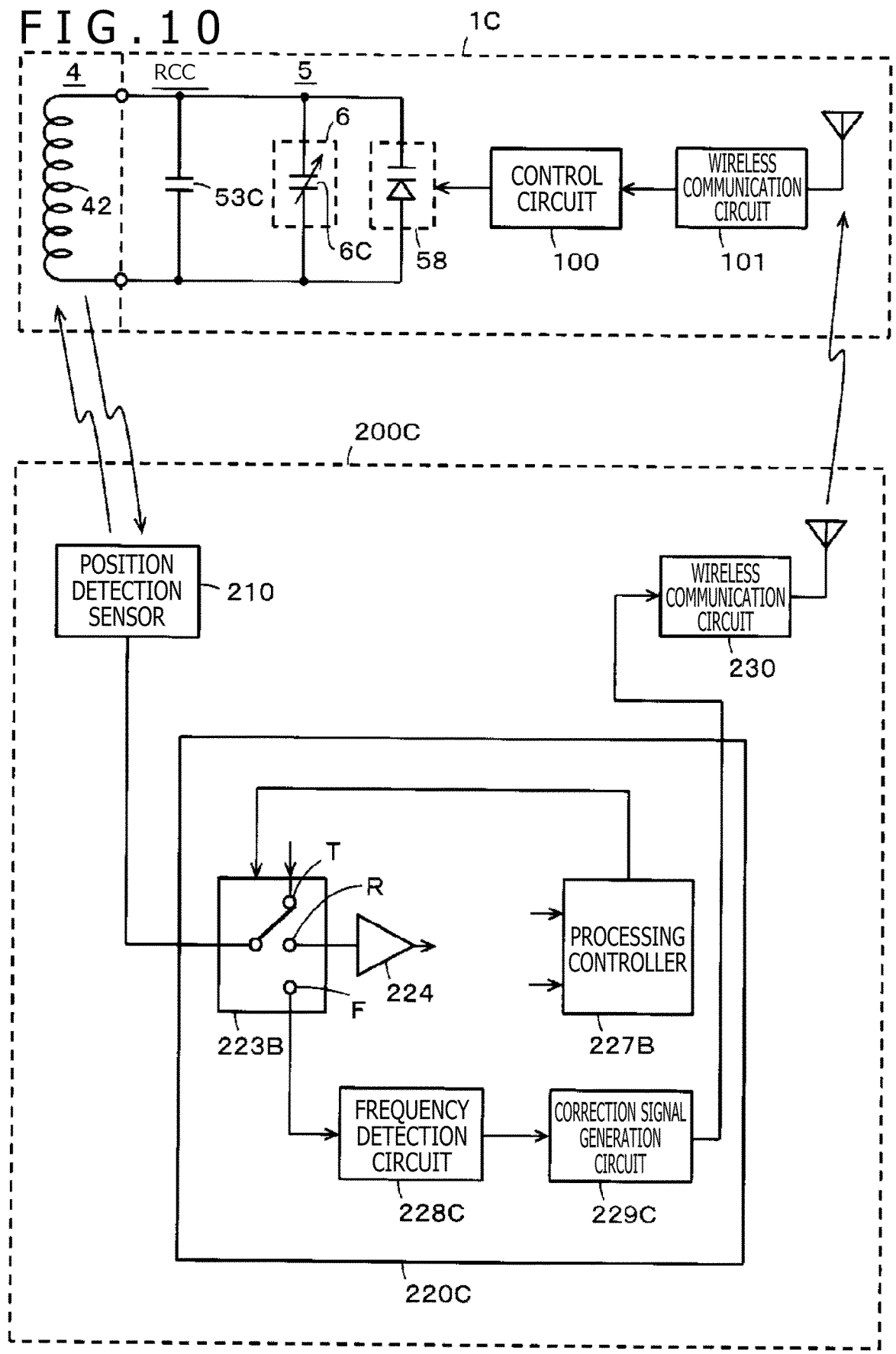
FIG. 10 is a diagram for describing an example of a configuration of an electronic pen of the electromagnetic coupling type according to a second example of the other embodiment of the present disclosure.

FIG. 10 is a diagram illustrating an example of electronic circuits of an electronic pen 1C and a position detection device 200C according to an embodiment of the second example. The electronic pen 1C according to the second example illustrated in FIG. 10 enables adjustment of the resonant frequency of the resonant circuit while having a configuration similar to that of the electronic pen 1 according to the first embodiment. Parts identical to those of the electronic pen 1 according to the first embodiment illustrated in FIG. 4, the position detection device 200 according to the first embodiment, and the position detection device 200B described above are denoted with the same reference signs, and the description thereof is omitted.

As illustrated in FIG. 10, the circuit unit 5 of the electronic pen 1C according to this example includes a resonant capacitor 53C, the variable-capacitance capacitor 6C constituted by the writing pressure detector 6, and a variable capacitance diode 58 which changes the capacitance according to the supply voltage. The resonant capacitor 53C, the variable-capacitance capacitor 6C, and the variable capacitance diode 58 are connected in parallel to each other, forming a resonant circuit RCC.

In this example, the circuit unit 5 also includes a control circuit 100 and a wireless communication circuit 101. In one or more embodiments, the control circuit includes a processor and a memory storing instructions that, when executed by the processor, cause the control circuit to perform the acts described herein. The control circuit 100 supplies a control voltage to the variable capacitance diode 58. The wireless communication circuit 101 wirelessly communicates with the position detection device 200C. In this example, the wireless communication circuit 101 performs wireless communication complying with Bluetooth (registered trademark) standard. This wireless communication circuit 101 supplies, to the control circuit 100, a correction signal received from the position detection device 200C. The correction signal is to be described later. From the received correction signal, the control circuit 100 generates a control voltage to control the capacitance of the variable capacitance diode 58.

The position detection device 200C includes the switching connection circuit 223B and a frequency detection circuit 228C. The switching connection circuit 223B is similar to that of the position detection device 200B according to the first example illustrated in FIG. 9. When the processing controller 227B receives, from the user, an instruction to start the mode of adjusting the resonant frequency of the resonant circuit RCC of the electronic pen 1C, the processing controller 227B controls the switching connection circuit 223B so as to switch to the resonant frequency adjustment terminal F.

The frequency detection circuit 228C of the position detection device 200C according to this example detects the frequency of the signal returned from the resonant circuit RCC of the electronic pen 1C and supplies a signal corresponding to the detected frequency to a correction signal generation circuit 229C. The correction signal generation circuit 229C identifies the frequency of the signal returned from the resonant circuit RCC of the electronic pen 1C, from the signal received from the frequency detection circuit 228C, and generates a correction signal corresponding to the difference between the frequency and an appropriate frequency.

The position detection device 200C according to this example includes a wireless communication circuit 230 which can wirelessly communicate with the wireless communication circuit 101 of the electronic pen 1C. The correction signal generated by the correction signal generation circuit 229C is transmitted to the electronic pen 1C through the wireless communication circuit 230.

In the second example, in adjusting the resonant frequency of the resonant circuit RCC of the electronic pen 1C, the processing controller 227B is given an instruction to start the mode of adjusting the resonant frequency with the electronic pen 1C and the position detection sensor 210 electromagnetically coupled to each other.

In response, the switching connection circuit 223B is caused to switch to the resonant frequency adjustment terminal F, and the reception signal received from the electronic pen 1C is supplied to the frequency detection circuit 228C in which the frequency is detected. Then, the correction signal generation circuit 229C generates a correction signal corresponding to the difference between the detected frequency and an appropriate frequency and transmits the correction signal to the electronic pen 1C through the wireless communication circuit 230.

In the electronic pen 1C, the wireless communication circuit 101 receives the correction signal from the position detection device 200C and supplies the correction signal to the control circuit 100. The control circuit 100 generates a control voltage from this correction signal and supplies the control voltage to the variable capacitance diode 58. As a result, the resonant frequency of the resonant circuit RCC is controlled and is automatically adjusted to the appropriate frequency.

Although the second example has been applied to the electronic pen 1 according to the first embodiment in the description above, it is needless to say that the second example can also be applied to the electronic pen 1A according to the second embodiment.

Further, although the variable capacitance diode 58 is connected in parallel to the resonant capacitor 53C in order to adjust the resonant frequency in the second example, the variable capacitance diode 58 may be connected in series to the resonant capacitor 53C.

Further, although the variable capacitance diode 58 is used to adjust the resonant frequency in the second example, a voltage-variable inductance element may be used.

Other Embodiments or Modifications

In the above-described embodiments, the writing pressure detected by the writing pressure detector is transmitted from the electronic pen to the position detection device as a change in the resonant frequency (a change in phase) of the resonant circuit. Alternatively, the electronic pen may be configured such that the operation of the resonant circuit is intermittently turned on and off. With this configuration, a pressure value can be converted into a digital signal and transmitted.

In this case, in the circuit portion of the electronic pen, a switch circuit for controlling on and off of the operation of the resonant circuit is connected in parallel to the coil of the resonant circuit, and a control circuit including, for example, an integrated circuit (IC) is disposed. Then, the control circuit detects the capacitance of the variable-capacitance capacitor constituted by the writing pressure detector, detects a writing pressure value from the detected capacitance, and converts the writing pressure value into a digital signal. The control circuit then causes the operation of the resonant circuit to turn on and off by controlling on and off of the switch circuit according to binary values "1" and "0" of the digital signal, thereby supplying writing pressure information to the position detection device as an amplitude shift keying (ASK) signal of the resonant frequency signal.

If the electronic pen 1C according to the second example of the other embodiment described above is configured in this manner, the control circuit 100 illustrated in FIG. 10 can be used as the control circuit for controlling on and off of the operation of the resonant circuit.

Further, as with the example of FIG. 10, when the electronic pen and the position detection device can wirelessly communicate with each other through the respective wireless communication circuits, the writing pressure information detected by the writing pressure detector may be transmitted from the electronic pen to the position detection device through wireless communication using the wireless communication circuits.

In the above-described embodiment, the writing pressure detector includes the variable-capacitance capacitor in which the conductive elastic member is pressed against one end surface (one electrode surface) of the dielectric via the ring-shaped spacer member according to the writing pressure and the contact area between the dielectric and the conductive elastic member then changes according to the writing pressure, so that the capacitance corresponding to the writing pressure is generated between the one end surface of the dielectric and the other end surface (the other electrode surface) of the dielectric. However, the configuration of the writing pressure detector is not limited thereto. For example, the variable-capacitance capacitor may be configured such that the dielectric is held by a terminal member and the conductive elastic member. Alternatively, the writing pressure detector can be configured by using a semiconductor element configured as a variable-capacitance capacitor including a micro electro mechanical systems (MEMS) element that can change the capacitance according to the writing pressure, as disclosed in Japanese Patent Laid-Open No. 2013-161307, for example.

Instead of employing the variable-capacitance capacitor, the writing pressure detector may be configured so as to change the inductance value according to the writing pressure.

Although the resonant capacitor is disposed in the circuit portion of the electronic pen, the coil and the resonant capacitor may be housed in the pen tip unit.

It is to be noted that embodiments of the present disclosure are not limited to the foregoing embodiments, and that various changes can be made without departing from the spirit of the present disclosure.

What is claimed is:
1. An electronic pen of an electromagnetic coupling type, comprising:
  a resonant circuit including a coil, the resonant circuit being configured to indicate a position to a position detection sensor through electromagnetic coupling between the resonant circuit and the position detection sensor;

an electronic pen main body; and a pen tip unit configured to be detachable from the electronic pen main body, wherein the pen tip unit includes a pen tip casing in which at least the coil is housed, and wherein the electronic pen main body includes a circuit portion of the resonant circuit that is electrically coupled to the coil housed in the pen tip unit when the pen tip unit is attached to the electronic pen main body.

2. The electronic pen of the electromagnetic coupling type according to claim 1, wherein the coil is wound around a rod-shaped magnetic core, and the rod-shaped magnetic core is housed in the pen tip unit such that a centerline direction of the rod-shaped magnetic core is parallel to an axial direction of the electronic pen.

3. The electronic pen of the electromagnetic coupling type according to claim 1, wherein a portion of the pen tip casing on a side of the pen tip casing opposite to a pen tip side of the pen tip casing is housed in a hollow portion of the cylindrical portion such that the pen tip unit is detachably attached to the electronic pen main body from an opening of a cylindrical portion formed in the electronic pen main body.

4. The electronic pen of the electromagnetic coupling type according to claim 1, wherein:

the pen tip unit includes two first electrode terminals electrically connected to a first end and a second end of the coil, respectively, the electronic pen main body includes two second electrode terminals configured to be electrically connected to the two first electrode terminals, respectively, when the pen tip unit is attached to the electronic pen main body, and the two second electrode terminals are electrically connected to the circuit portion.

5. The electronic pen of the electromagnetic coupling type according to claim 4, wherein the circuit portion of the electronic pen main body includes a circuit board, and the two second electrode terminals are disposed on the circuit board such that, when the pen tip unit is attached to the electronic pen main body, the two second electrode terminals contact and are electrically connected to the two first electrode terminals of the pen tip unit, respectively.

6. The electronic pen of the electromagnetic coupling type according to claim 1, wherein a capacitor that constitutes part of the resonant circuit and is connected in parallel to the coil is disposed in the pen tip casing of the pen tip unit.

7. The electronic pen of the electromagnetic coupling type according to claim 1, wherein the circuit portion of the electronic pen main body includes a switch configured to be turned on and off according to a user operation and is configured such that, with the pen tip unit attached to the electronic pen main body, a resonant frequency of the resonant circuit is changed when the switch is turned on and off.

8. The electronic pen of the electromagnetic coupling type according to claim 1, wherein the electronic pen main body includes a writing pressure detector configured to detect a writing pressure applied to a pen tip of the pen tip unit, as a resonant frequency changing element that changes a resonant frequency of the resonant circuit, and the circuit portion is configured such that, with the pen tip unit attached to the electronic pen main body, the resonant frequency changing element constituted by the writing pressure detector changes the resonant frequency of the resonant circuit according to the applied writing pressure.

9. The electronic pen of the electromagnetic coupling type according to claim 8, wherein:

the writing pressure detector is housed in a cylindrical portion and is movable in an axial direction of the electronic pen inside a hollow portion of a cylindrical outer casing of the electronic pen, and the writing pressure detector detects, as the writing pressure, a pressure generated when an entirety of the pen tip unit and the electronic pen main body is moved due to a pressure applied to the pen tip of the pen tip unit attached to the electronic pen main body.

10. The electronic pen of the electromagnetic coupling type according to claim 1, wherein the pen tip casing of the pen tip unit is made of at least a resin.

11. The electronic pen of the electromagnetic coupling type according to claim 10, wherein the pen tip casing of the pen tip unit has a shape of a pen tip of a fountain pen, and the coil is disposed at a position that is eccentric from a centerline position of a cylindrical outer casing of the electronic pen at a back side of the pen tip of the fountain pen.

12. The electronic pen of the electromagnetic coupling type according to claim 1, wherein the pen tip casing of the pen tip unit includes a writing pressure detector configured to detect a writing pressure applied to a pen tip of the pen tip unit, as a resonant frequency changing element that changes a resonant frequency of the resonant circuit.

13. The electronic pen of the electromagnetic coupling type according to claim 12, wherein:

the coil is wound around a magnetic core including a through hole in an axial direction of the electronic pen, the magnetic core around which the coil is wound is housed in the pen tip casing of the pen tip unit such that the magnetic core and the writing pressure detector are disposed in the axial direction of the electronic pen with the magnetic core located closer to the pen tip than the writing pressure detector and such that the through hole of the magnetic core faces an outside of the pen tip casing, and a core body is inserted into the magnetic core through the through hole and is movable in the axial direction of the electronic pen, and an end portion of the core body on a side of the core body opposite to the pen tip is fitted into the writing pressure detector and transmits the writing pressure to the writing pressure detector.

14. The electronic pen of the electromagnetic coupling type according to claim 13, wherein:

an end portion of the magnetic core on a pen tip side of the magnetic core in the axial direction of the electronic pen protrudes from the pen tip casing, and the core body is inserted into the magnetic core through the through hole of the end portion of the magnetic core protruding from the pen tip casing.

15. The electronic pen of the electromagnetic coupling type according to claim 1, wherein:

the circuit portion included in the electronic pen main body includes a variable capacitance element or a variable inductance element that is configured to adjust a resonant frequency of the resonant circuit, and the variable capacitance element or the variable inductance element is configured such that a capacitance value or an inductance value is adjustable from an outside of the electronic pen.

16. The electronic pen of the electromagnetic coupling type according to claim 1, wherein:
the pen tip casing of the pen tip unit includes a variable capacitance element or a variable inductance element that is configured to adjust a resonant frequency of the resonant circuit, and
the variable capacitance element or the variable inductance element is configured such that a capacitance value or an inductance value is adjustable from an outside electronic pen.

17. The electronic pen of the electromagnetic coupling type according to claim 1, wherein:
the circuit portion included in the electronic pen main body includes:
a variable capacitance element or a variable inductance element that is configured to adjust a resonant frequency of the resonant circuit according to a control signal received,
a control circuit which, in operation, generates the control signal, and
a communication circuit which, in operation, receives a resonant frequency adjustment signal from a position detection device, and
the control circuit generates the control signal from the resonant frequency adjustment signal received through the communication circuit and supplies the control signal to the variable capacitance element or the variable inductance element.

* * * * *